US012043040B2

(12) United States Patent
Sasaki et al.

(10) Patent No.: US 12,043,040 B2
(45) Date of Patent: Jul. 23, 2024

(54) CARTRIDGE AND TAPE PRINTING DEVICE

(71) Applicant: SEIKO EPSON CORPORATION, Tokyo (JP)

(72) Inventors: Taishi Sasaki, Matsumoto (JP); Shinsaku Kosuge, Matsumoto (JP); Akio Ishimoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 243 days.

(21) Appl. No.: 17/439,137

(22) PCT Filed: Mar. 16, 2020

(86) PCT No.: PCT/JP2020/011479
§ 371 (c)(1),
(2) Date: Sep. 14, 2021

(87) PCT Pub. No.: WO2020/189626
PCT Pub. Date: Sep. 24, 2020

(65) Prior Publication Data

US 2022/0153035 A1 May 19, 2022

(30) Foreign Application Priority Data

Mar. 19, 2019 (JP) ................................ 2019-051755
Aug. 6, 2019 (JP) ................................ 2019-144704

(51) Int. Cl.
*B41J 2/325* (2006.01)
*B41J 3/407* (2006.01)

(52) U.S. Cl.
CPC ............. *B41J 2/325* (2013.01); *B41J 3/4075* (2013.01)

(58) Field of Classification Search
CPC ........ B41J 2/325; B41J 3/4075; B41J 15/044; B41J 17/32
See application file for complete search history.

(56) References Cited

U.S. PATENT DOCUMENTS 5,333,959 A 8/1994 Yamaguchi et al.
5,399,036 A 3/1995 Yamaguchi
(Continued)

FOREIGN PATENT DOCUMENTS

JP H06-227102 A 8/1994
JP H10-086494 A 4/1998
(Continued)

OTHER PUBLICATIONS

Imai, Kazuhide, Printer, Jan. 15, 2003, Japan, All Pages (Year: 2003).*

*Primary Examiner* — Justin Seo
*Assistant Examiner* — Tracey M McMillion
(74) *Attorney, Agent, or Firm* — Oliff PLC

(57) ABSTRACT

A cartridge, that can reduce the diameter of a winding core, to be installed in a tape printing device includes: a cartridge case that constitutes an outer shell of the cartridge and accommodates a printing tape, a tape core on which the printing tape is wound, an ink ribbon, and a winding core; a core concave part on the cartridge case and into which a core convex part is inserted from a back side in an installation direction when the cartridge is installed in a cartridge installation part; and a cartridge-side first engagement part and a cartridge-side second engagement part that engage a device-side first engagement part and a device-side second engagement part, respectively, when the core convex part is inserted into the core concave part to change a state of a torque switching mechanism from a second to a first state or from the first to the second state.

10 Claims, 23 Drawing Sheets

(56) References Cited

U.S. PATENT DOCUMENTS

| | | | | |
|---|---|---|---|---|
| 6,042,038 | A | 3/2000 | Shiraishi | |
| 6,106,176 | A * | 8/2000 | Yanagisawa | B41J 19/202 400/279 |
| 6,145,769 | A | 11/2000 | Shiraishi et al. | |
| 2016/0159123 | A1 | 6/2016 | Sakano | |
| 2017/0096022 | A1 | 4/2017 | Sakano | |
| 2017/0326892 | A1 | 11/2017 | Sakano | |
| 2018/0044128 | A1 * | 2/2018 | Sakano | B41J 3/4075 |
| 2018/0099515 | A1 | 4/2018 | Sakano | |
| 2018/0290467 | A1 | 10/2018 | Sakano | |
| 2018/0297384 | A1 * | 10/2018 | Sasaki | B41J 33/22 |

FOREIGN PATENT DOCUMENTS

| | | | |
|---|---|---|---|
| JP | 2000-037938 | A | 2/2000 |
| TW | I649210 | B | 2/2019 |

* cited by examiner

CARTRIDGE AND TAPE PRINTING DEVICE

TECHNICAL FIELD

The present invention relates to a cartridge including a winding core by which an ink ribbon is wound up and a tape printing device.

BACKGROUND ART

As disclosed in Patent Document 1, a printing device in which a first power transmission shaft and a second power transmission shaft of a double-cylinder structure are provided to be rotatable independently of each other with respect to a central shaft has been conventionally known. A first torque is transmitted from a driving gear to the first power transmission shaft via a clutch spring, and a second torque smaller than the first torque is transmitted from the driving gear to the second power transmission shaft via another clutch spring. When a cartridge accommodating an ink ribbon having a wide width is installed in the printing device, the first power transmission shaft engages a ribbon winding spool and an ink ribbon is wound up by the ribbon winding spool at the first torque. When a cartridge accommodating an ink ribbon having a narrow width is installed in the printing device, the second power transmission shaft engages the ribbon winding spool and the ink ribbon is wound up by the ribbon winding spool at the second torque.

[Patent Document 1] JP-A-6-227102

DISCLOSURE OF THE INVENTION

Since a conventional printing device includes a first power transmission shaft and a second power transmission shaft of a double-cylinder structure, the diameter of a ribbon winding spool is increased and a cartridge is upsized.

A cartridge according to the present invention is a cartridge to be installed in a tape printing device including a cartridge installation part in which the cartridge including a winding core by which an ink ribbon is wound up is installed, a winding rotation element that engages the winding core when the cartridge is installed in the cartridge installation part, a core convex part that is provided in the cartridge installation part and protrudes to a front side in an installation direction of the cartridge, a device-side engagement part that is provided on a back side in the installation direction with respect to an opening part provided on the core convex part, and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, the cartridge including: a cartridge case that constitutes an outer shell of the cartridge and accommodates a printing tape, a tape core on which the printing tape is wound, the ink ribbon, and the winding core; a core concave part that is provided on the cartridge case and into which the core convex part is inserted from the back side in the installation direction when the cartridge is installed in the cartridge installation part; and a cartridge-side engagement part that engages the device-side engagement part when the core convex part is inserted into the core concave part to change the state of the torque switching mechanism from the second state to the first state or from the first state to the second state.

A tape printing device according to the present invention is a tape printing device including: a cartridge installation part in which a first cartridge and a second cartridge each having a different width of an ink ribbon are to be alternatively installed, the first cartridge and the second cartridge including a printing tape, a tape core on which the printing tape is wound, the ink ribbon, a winding core by which the ink ribbon is wound up, a cartridge case in which the printing tape, the tape core, the ink ribbon, and the winding core are accommodated, and a core concave part that is provided on the cartridge case; a winding rotation element that engages the winding core when the cartridge is installed in the cartridge installation part; a stepped cylindrical core convex part that is provided in the cartridge installation part and inserted into the core concave part from a back side in an installation direction of the cartridge when the cartridge is installed in the cartridge installation part; a device-side engagement part that is provided on the back side in the installation direction with respect to an opening part provided on the core convex part; and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, wherein one of the first cartridge and the second cartridge has a cartridge-side engagement part that engages the device-side engagement part when the cartridge is installed in the cartridge installation part, and the torque switching mechanism changes the state thereof from the second state to the first state or from the first state to the second state by engagement between the cartridge-side engagement part and the device-side engagement part when the cartridge including the cartridge-side engagement part among the first cartridge and the second cartridge is installed in the cartridge installation part.

BEST MODES FOR CARRYING OUT THE INVENTION

Hereinafter, an embodiment of a tape printing device and a cartridge will be described with reference to the accompanying drawings. Note that although the following drawings display an XYZ orthogonal coordinate system, they are given only for convenience of explanation and do not intend to limit the following embodiments at all. Further, numeric values showing the numbers or the like of respective parts are given only for illustration and do not intend to limit the following embodiments at all.

[Outline of Tape Printing Device, Tape Cartridge, and Ribbon Cartridge]

Figure 1:
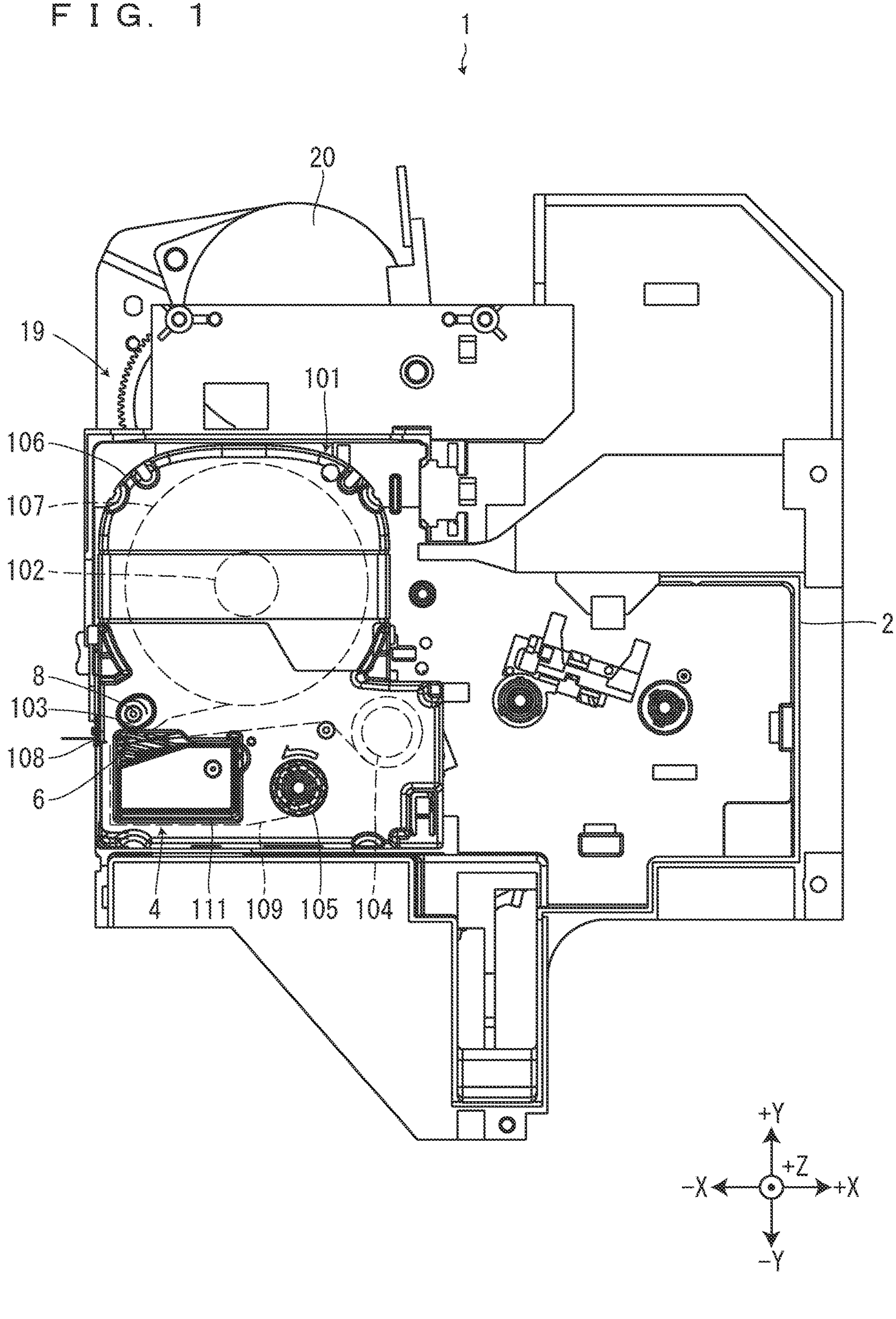
FIG. 1 is a view of a tape printing device when seen from a front side in an installation direction in a state in which a tape cartridge is installed in a cartridge installation part.
Figure 2:
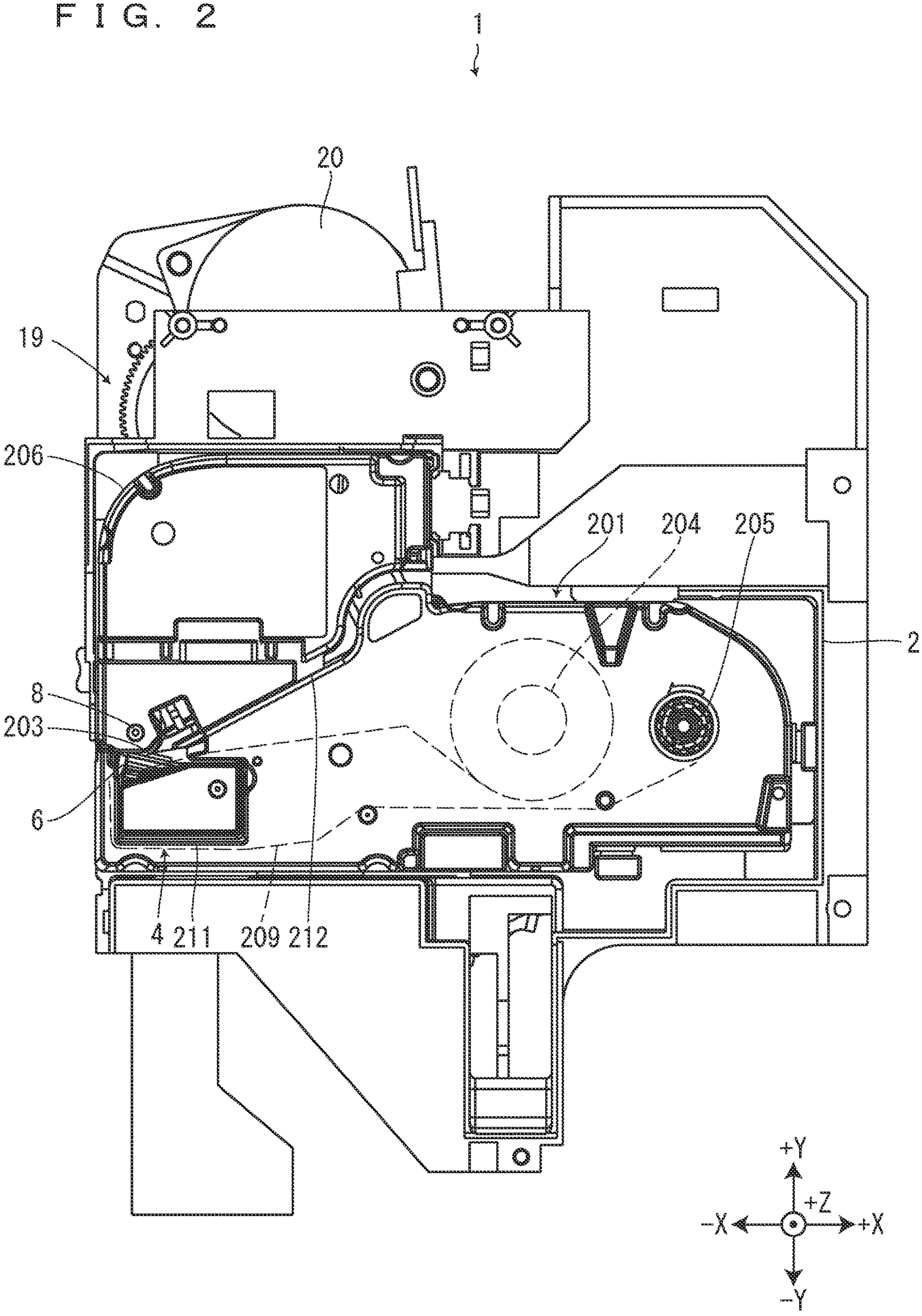
FIG. 2 is a view of the tape printing device when seen from the front side in the installation direction in a state in which a ribbon cartridge is installed in the cartridge installation part.
Figure 3:
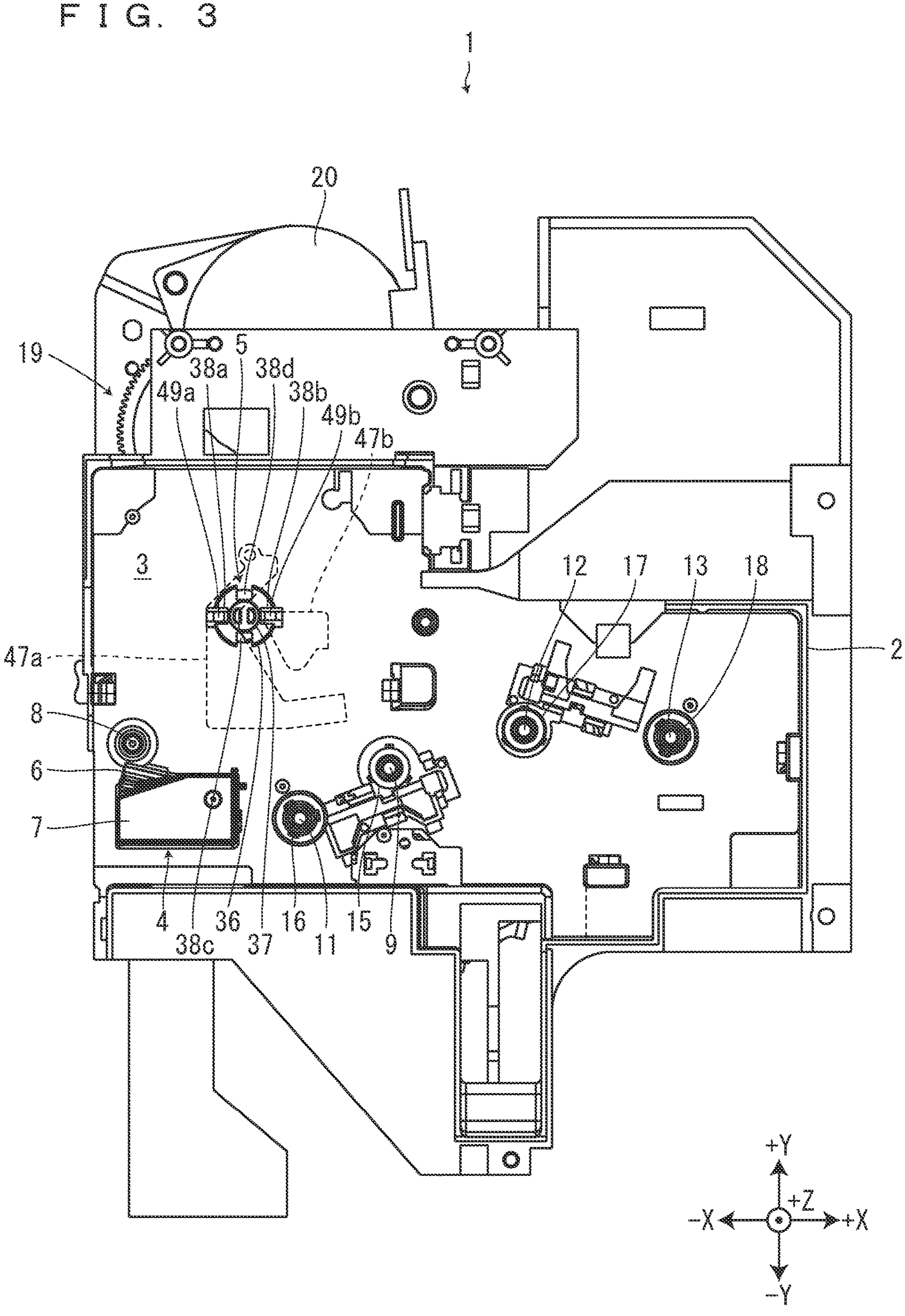
FIG. 3 is a view of the tape printing device when seen from the front side in the installation direction in a state in which both the tape cartridge and the ribbon cartridge are not installed in the cartridge installation part.

As shown in FIGS. 1 to 3, a tape printing device 1 includes a cartridge installation part 2 in which a tape cartridge 101 and a ribbon cartridge 201 are to be alternatively installed. Note that although omitted in the figures, the tape printing device 1 includes an installation part cover for opening and closing the cartridge installation part 2.

As shown in FIG. 1, the tape cartridge 101 includes a tape core 102, a first platen roller 103, a first paying-out core 104, a first winding core 105, and a first cartridge case 106. A first printing tape 107 is wound on the tape core 102. The first printing tape 107 that has been paid out from the tape core 102 is delivered to the outside of the first cartridge case 106 from a tape delivering port 108 provided on the peripheral wall part on the −X side of the first cartridge case 106. A first ink ribbon 109 is wound on the first paying-out core 104. The first ink ribbon 109 that has been paid out from the first paying-out core 104 is wound up by the first winding core 105. The first cartridge case 106 constitutes the outer shell of the tape cartridge 101 and accommodates the tape core 102, the first platen roller 103, the first paying-out core 104, the first winding core 105, the first printing tape 107, and the first ink ribbon 109. The first cartridge case 106 has a first head insertion hole 111 provided so as to penetrate in a Z direction.

As shown in FIG. 2, the ribbon cartridge 201 includes a second platen roller 203, a second paying-out core 204, a second winding core 205, and a second cartridge case 206. A second ink ribbon 209 is wound on the second paying-out core 204. The second ink ribbon 209 that has been paid out from the second paying-out core 204 is wound up by the second winding core 205. The second cartridge case 206 constitutes the outer shell of the ribbon cartridge 201 and accommodates the second platen roller 203, the second paying-out core 204, the second winding core 205, and the second ink ribbon 209. The second cartridge case 206 has a second head insertion hole 211 provided so as to penetrate in an installation direction. Further, the second cartridge case 206 is provided with a second tape path 212. Although omitted in the figures, a second printing tape that has been paid out from a tape roll provided on the outside of the tape printing device 1 is introduced into the second tape path 212.

Note that the length of a second printing tape in a tape roll that has not been used and the length of the second ink ribbon 209 accommodated in the ribbon cartridge 201 that has not been used are not particularly limited but are longer than the length of the first printing tape 107 and the length of the first ink ribbon 109 accommodated in the tape cartridge 101 that has not been used, respectively, in the present embodiment. Therefore, the ribbon cartridge 201 is installed in the cartridge installation part 2, for example, when large amounts of labels are created at once.

Figure 4:
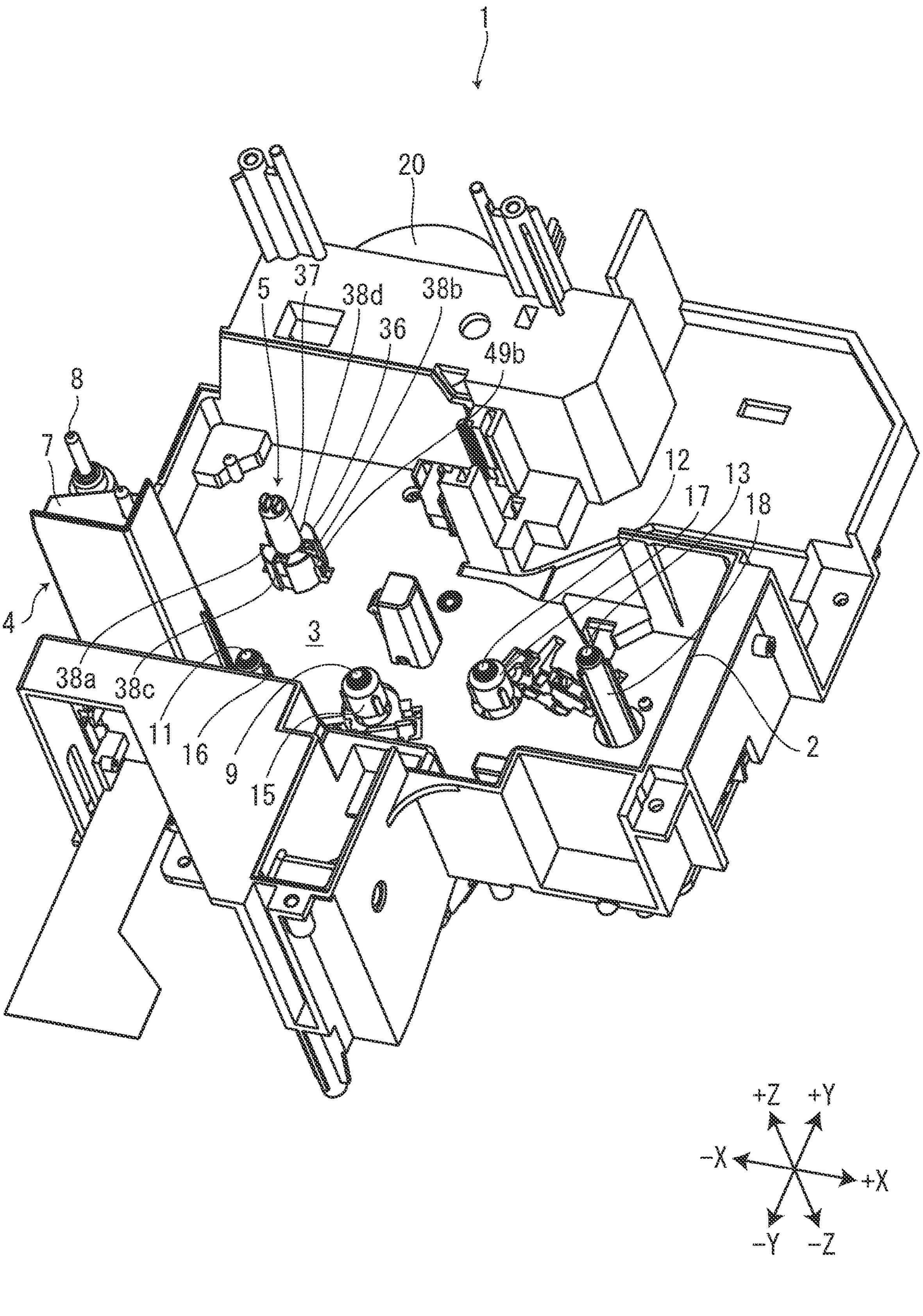
FIG. 4 is a perspective view of the tape printing device in a state in which both the tape cartridge and the ribbon cartridge are not installed in the cartridge installation part.

As shown in FIGS. 3 and 4, the cartridge installation part 2 is formed into a concave shape having an opening on a +Z side. The cartridge installation part 2 has, on its bottom surface of the cartridge installation part 2, i.e., on an installation bottom surface 3 that is a surface on a −Z side, a head part 4 and a core convex part 5 provided to protrude to a front side in the installation direction. The head part 4 includes a printing head 6 and a head cover 7 that covers at least the +X side, the −Y side, and the +Z side of the printing head 6. The printing head 6 is a thermal head including a heat generation element. When the tape cartridge 101 is installed in the cartridge installation part 2, the head cover 7 is inserted into the first head insertion hole 111 and guides the installation of the tape cartridge 101. Further, when the ribbon cartridge 201 is installed in the cartridge installation part 2, the head cover 7 is inserted into the second head insertion hole 211 and guides the installation of the ribbon cartridge 201. Note that a core convex part 5 will be described later.

Further, the cartridge installation part 2 has, on the installation bottom surface 3, a platen shaft 8, a first winding shaft 11, a first paying-out shaft 9, a second paying-out shaft 12, and a second winding shaft 13 provided so as to protrude to the +Z side in an order from the −X side.

The platen shaft 8 is provided on the +Y side of the printing head 6. The platen shaft 8 has a larger protrusion amount toward a front side in an installation direction, compared with the first paying-out shaft 9, the first winding shaft 11, the second paying-out shaft 12, and the second winding shaft 13. When the tape cartridge 101 is installed in the cartridge installation part 2, the platen shaft 8 is inserted into the first platen roller 103 and guides the installation of the tape cartridge 101 together with the head cover 7. Further, when the ribbon cartridge 201 is installed in the cartridge installation part 2, the platen shaft 8 is inserted into the second platen roller 203 and guides the installation of the ribbon cartridge 201 together with the head cover 7. Note that the installation direction of the tape cartridge 101 or the ribbon cartridge 201 will be simply called an "installation direction" below. The installation direction is parallel to a direction in which the platen shaft 8 extends, i.e., the Z direction. Further, the front side in the installation direction indicates the +Z side, and a back side in the installation direction indicates the −Z side.

A platen rotation element 14 (see FIG. 6), a first paying-out rotation element 15, a first winding rotation element 16, a second paying-out rotation element 17, and a second winding rotation element 18 are rotatably supported by the platen shaft 8, the first paying-out shaft 9, the first winding shaft 11, the second paying-out shaft 12, and the second winding shaft 13, respectively. When the tape cartridge 101 is installed in the cartridge installation part 2, the first platen roller 103, the first paying-out core 104, and the first winding core 105 provided in the tape cartridge 101 engage the platen rotation element 14, the first paying-out rotation element 15, and the first winding rotation element 16, respectively. Further, when the ribbon cartridge 201 is installed in the cartridge installation part 2, the second platen roller 203, the second paying-out core 204, and the second winding core 205 provided in the ribbon cartridge 201 engage the platen rotation element 14, the second paying-out rotation element 17, and the second winding rotation element 18 provided in the cartridge installation part 2, respectively. The rotation of a feeding motor 20 is transmitted to the platen rotation element 14, the first paying-out rotation element 15, the first winding rotation element 16, the second paying-out rotation element 17, and the second winding rotation element 18 via a feeding wheel train 19.

[Feeding Wheel Train]

Figure 5:
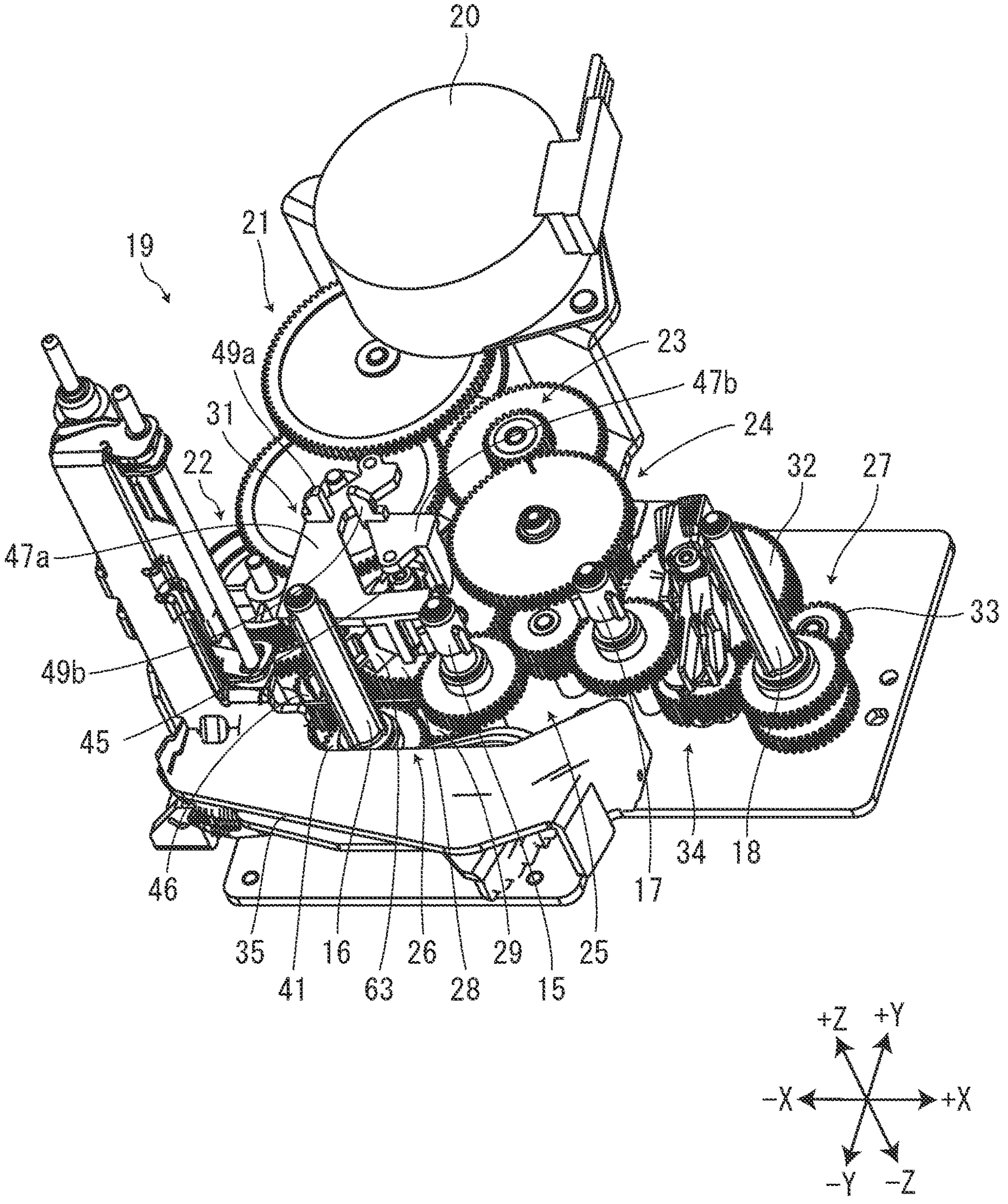
FIG. 5 is a perspective view of a feeding wheel train.
Figure 6:
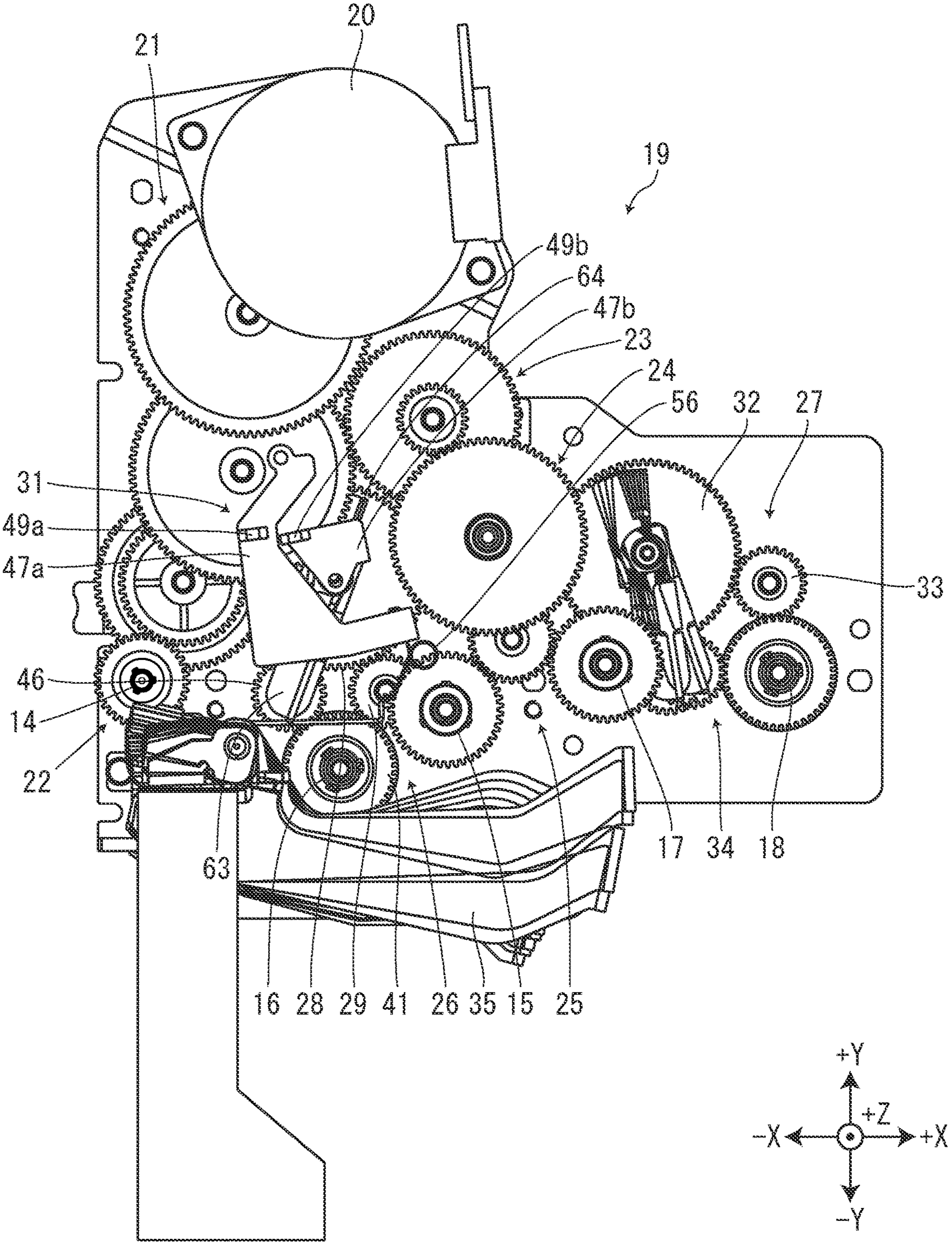
FIG. 6 is a view of the feeding wheel train when seen from the front side in the installation direction, showing a state that a movable gear meshes with a first winding gear.
Figure 7:
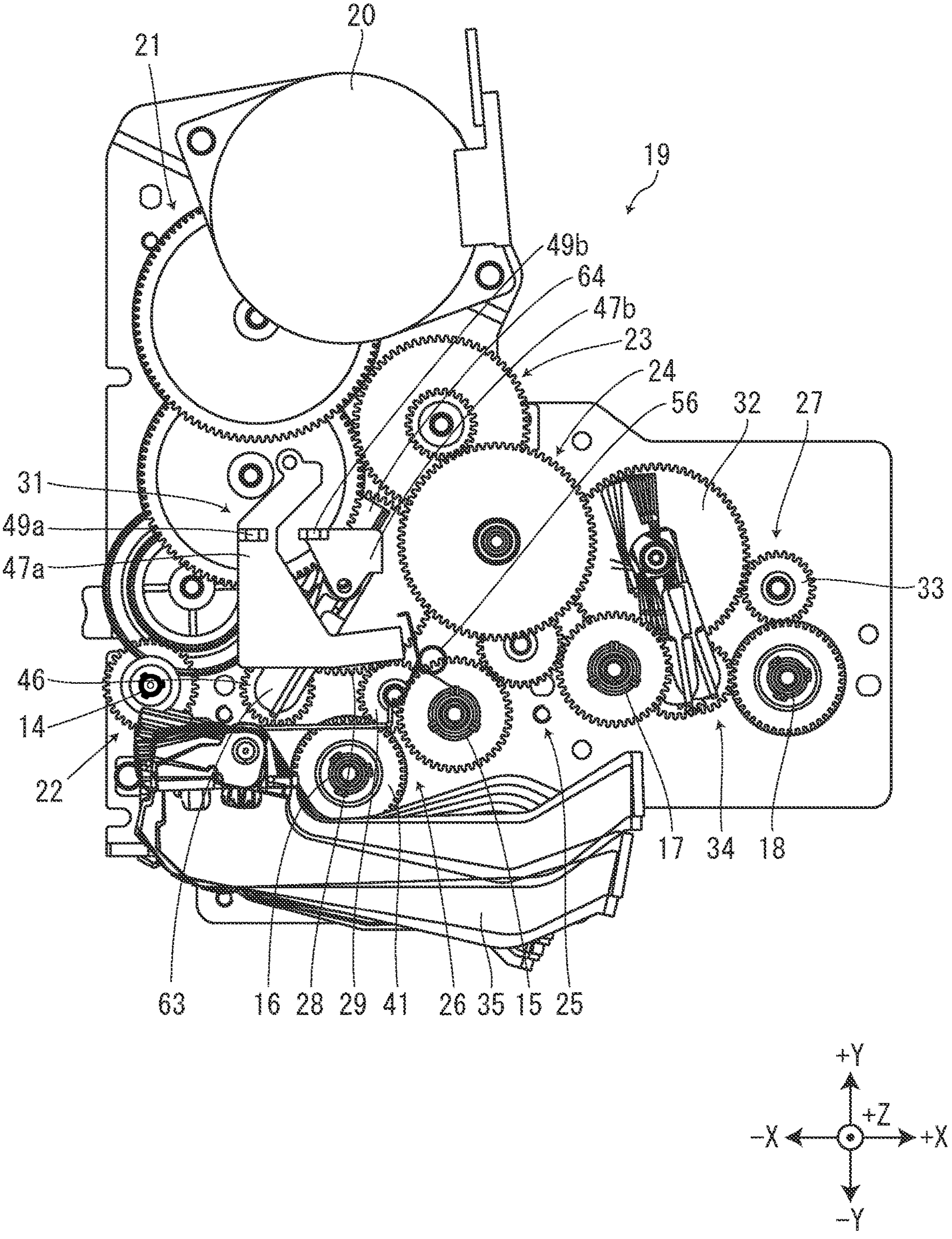
FIG. 7 is a view of the feeding wheel train when seen from the front side in the installation direction, showing a state that the movable gear disengages from the first winding gear.

As shown in FIGS. 5 to 7, the feeding wheel train 19 includes a motor-side wheel train 21, a platen-side wheel train 22, a ribbon-side wheel train 23, a one-way clutch unit 24, a paying-out-side wheel train 25, a first-winding-side wheel train 26, and a second-winding-side wheel train 27.

The motor-side wheel train 21 transmits the rotation of the feeding motor 20 to the platen-side wheel train 22 and the ribbon-side wheel train 23. The platen-side wheel train 22 transmits the rotation of the feeding motor 20 input via the motor-side wheel train 21 to the platen rotation element 14. The ribbon-side wheel train 23 transmits the rotation of the feeding motor 20 input via the motor-side wheel train 21 to the one-way clutch unit 24.

The one-way clutch unit 24 switches the transmission destination of the rotation of the feeding motor 20 input via the ribbon-side wheel train 23 between the paying-out-side wheel train 25, the first-winding-side wheel train 26, and the second-winding-side wheel train 27 according to the rotation direction of the feeding motor 20. That is, when the feeding motor 20 rotates in a first direction, the one-way clutch unit 24 does not transmit the rotation of the feeding motor 20 input via the ribbon-side wheel train 23 to the paying-out-side wheel train 25 but transmits the same to the first-winding-side wheel train 26 and the second-winding-side wheel train 27. Therefore, when the feeding motor 20 rotates in the first direction, the first paying-out rotation element 15 and the second paying-out rotation element 17 do not rotate but the first winding rotation element 16 and the second winding rotation element 18 rotate. Note that the first direction indicates a clockwise direction in FIGS. 6 and 7. When the feeding motor rotates in the first direction, the first winding rotation element 16 and the second winding rotation element 18 rotate in a direction opposite to the first direction, that is, rotate counterclockwise.

On the other hand, when the feeding motor 20 rotates in a second direction opposite to the first direction, the one-way clutch unit 24 transmits the rotation of the feeding motor 20 input via the ribbon-side wheel train 23 to the paying-out-side wheel train 25 but does not transmit the same to the first-winding-side wheel train 26 and the second-winding-side wheel train 27. Therefore, when the feeding motor 20 rotates in the second direction, the first paying-out rotation element 15 and the second paying-out rotation element 17 rotate counterclockwise and the first winding rotation element 16 and the second winding rotation element 18 do not rotate. Note that although omitted in the figures, the one-way clutch unit 24 includes two one-way clutches.

The paying-out-side wheel train 25 transmits the rotation of the feeding motor 20 input via the one-way clutch unit 24 to the first-paying-out rotation element 15 and the second paying-out rotation element 17.

The first-winding-side wheel train 26 transmits the rotation of the feeding motor 20 input via the one-way clutch unit 24 to the first winding rotation element 16. The first-winding-side wheel train 26 includes a first-winding-side first gear 28, a first-winding-side second gear 29 meshing with the first-winding-side first gear 28, and a first torque switching mechanism 31 to which the rotation of the feeding motor 20 is input via the one-way clutch unit 24. The first torque switching mechanism 31 is used to switch a torque to be transmitted to the first winding rotation element 16. Note that the first torque switching mechanism 31 will be described later.

The second-winding-side wheel train 27 transmits the rotation of the feeding motor 20 input via the one-way clutch unit 24 to the second winding rotation element 18. The second-winding-side wheel train 27 includes a second-winding-side first gear 32, a second-winding-side second gear 33 meshing with the second-winding-side first gear 32, and a second torque switching mechanism 34 configured like the first torque switching mechanism 31 to which the rotation of the feeding motor 20 is input via the one-way clutch unit 24.

[Printing Processing Performed when Tape Cartridge is Installed]

When the tape cartridge 101 is installed in the cartridge installation part 2 as shown in FIG. 1, the first platen roller 103, the first paying-out core 104, and the first winding core 105 provided in the tape cartridge 101 engage the platen rotation element 14, the first paying-out rotation element 15, and the first winding rotation element 16 provided in the cartridge installation part 2 shown in FIG. 3, respectively. Thus, the transmission of the rotation of the feeding motor 20 to the first platen roller 103, the first paying-out core 104, and the first winding core 105 is made possible.

Further, when the tape cartridge 101 is installed in the cartridge installation part 2, the head part 4 provided in the cartridge installation part 2 is inserted into the first head insertion hole 111 provided on the tape cartridge 101. When the installation part cover is closed after the tape cartridge 101 is installed in the cartridge installation part 2, the printing head 6 moves toward the platen shaft 8 with a head movement mechanism 35 (see FIG. 5). Thus, the first printing tape 107 and the first ink ribbon 109 are held between the printing head 6 and the first platen roller 103.

When the feeding motor 20 rotates in the first direction in this state, the rotation of the feeding motor 20 is transmitted to the platen rotation element 14 and the first winding rotation element 16 via the feeding wheel train 19. As a result, the first platen roller 103 rotates in a feeding direction, while the first winding core 105 rotates in a winding direction. Here, the feeding direction of the first platen roller 103 indicates a direction in which the first platen roller 103 rotates so that the first printing tape 107 is fed toward the tape delivering port 108. Further, the winding direction of the first winding core 105 indicates a direction in which the first winding core 105 rotates so that the first ink ribbon 109 that has been paid out from the first paying-out core 104 is wound up by the first winding core 105. In other words, the feeding direction of the first platen roller 103 is a clockwise direction, and the winding direction of the first winding core 105 is a counterclockwise direction in FIG. 1.

Further, when the feeding motor 20 rotates in the second direction, the rotation of the feeding motor 20 is transmitted to the platen rotation element 14 and the first paying-out rotation element 15 via the feeding wheel train 19. As a result, the first platen roller 103 rotates in a pulling-back direction, while the first paying-out core 104 rotates in a rewinding direction. Here, the pulling-back direction of the first platen roller 103 indicates a direction in which the first platen roller 103 rotates so that the first printing tape 107 that has been fed toward the tape delivering port 108 is pulled back. Further, the rewinding direction of the first paying-out core 104 indicates a direction in which the first paying-out core 104 rotates so that the first ink ribbon 109 that has been paid out from the first paying-out core 104 is rewound by the first paying-out core 104. In other words, both the pulling-back direction of the first platen roller 103 and the rewinding direction of the first paying-out core 104 indicate a counterclockwise direction.

By rotating the feeding motor 20 in the first direction and heating the printing head 6, the tape printing device 1 prints printing information input via a keyboard or the like omitted in the figures on the first printing tape 107, while feeding the first printing tape 107 and the first ink ribbon 109. Although omitted in the figures, the tape printing device 1 causes a cutter provided between the cartridge installation part 2 and a tape discharging port to perform a cutting operation to cut off a printed portion of the first printing tape 107 after completing the printing. After that, by causing the feeding motor 20 to rotate in the second direction, the tape printing device 1 pulls back the first printing tape 107 until the tip end of the first printing tape 107 comes to the vicinity of a position at which the printing head 6 and the first platen roller 103 are held. Thus, a margin generated at the front in the longitudinal direction of the first printing tape 107 that is to be next printed can be shortened.

Note that the tape printing device 1 similarly performs printing processing also when the ribbon cartridge 201 is installed in the cartridge installation part 2. That is, the tape printing device 1 performs printing on the second printing tape, while feeding the second printing tape and the second ink ribbon 209 held between the printing head 6 and the second platen roller 203.

[Tape Cartridge]

Figure 8:
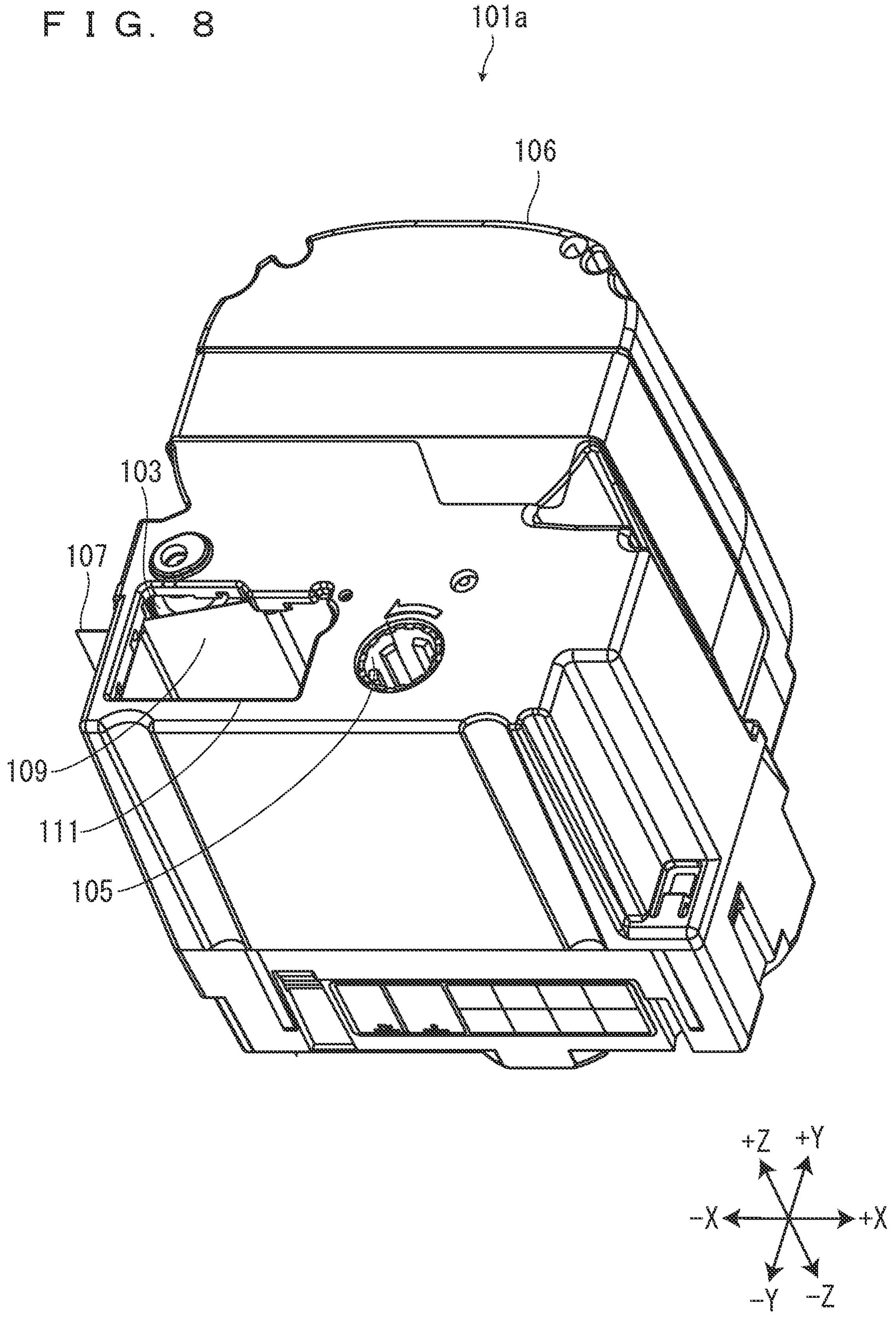
FIG. 8 is a perspective view of a first tape cartridge.
Figure 9:
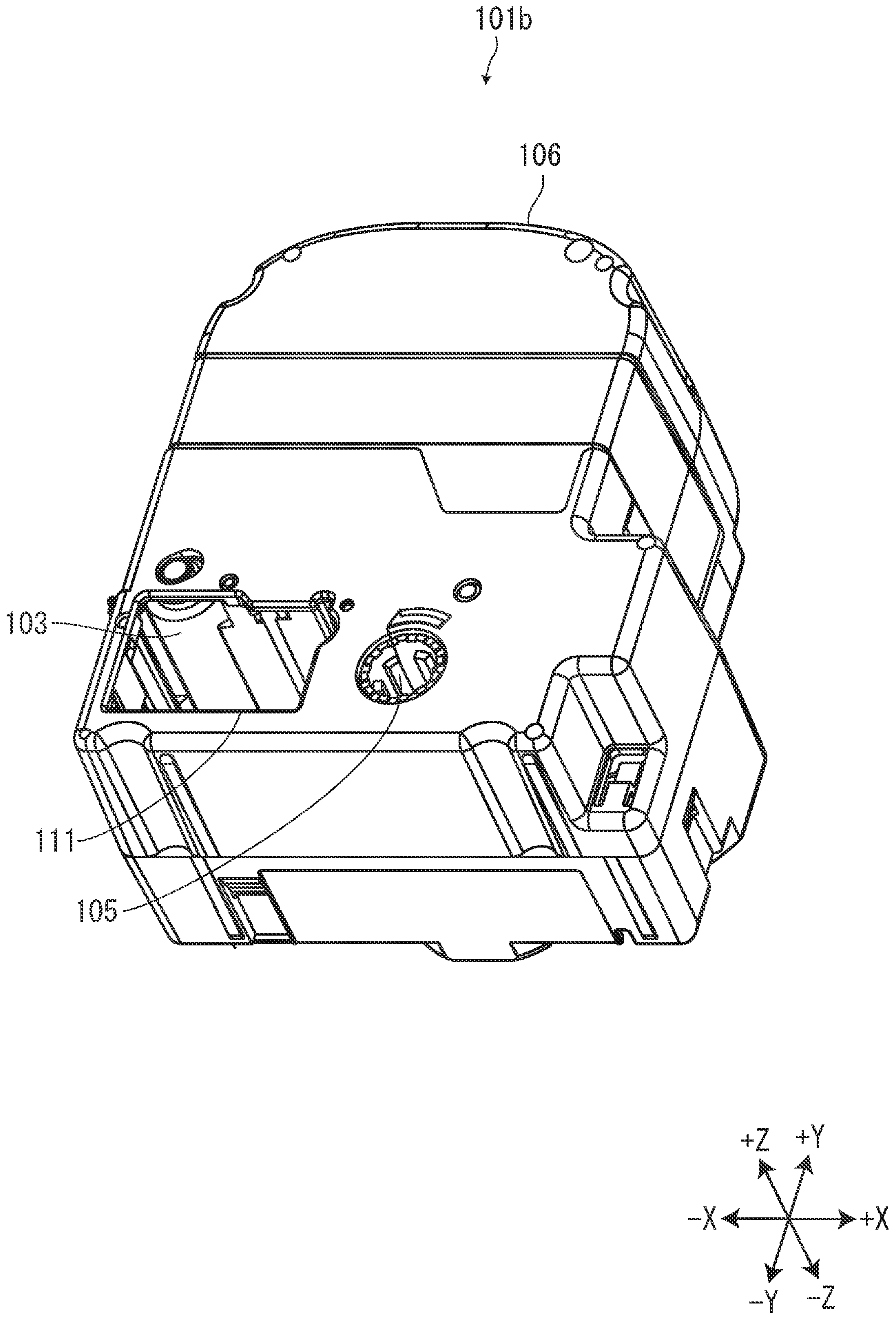
FIG. 9 is a perspective view of a second tape cartridge.

As tape cartridges 101, a first tape cartridge 101*a* in which a first printing tape 107 and a first ink ribbon 109 having a wide width, for example, a width of 50 mm are accommodated as shown in FIG. 8 and a second tape cartridge 101*b* in which the first printing tape 107 and the first ink ribbon 109 having a narrow width, for example, a width of 36 mm are accommodated as shown in FIG. 9 are prepared. Note that the first printing tape 107 and the first ink ribbon 109 are omitted in FIG. 9. Hereinafter, the first tape cartridge 101*a* and the second tape cartridge 101*b* will be simply called tape cartridges 101 when they are not required to be distinguished from each other. The first tape cartridge 101*a* and the second tape cartridge 101*b* are configured to be substantially similar to each other, and the drawing of the first tape cartridge 101*a* will be used as a representative to describe common configurations.

Figure 10:
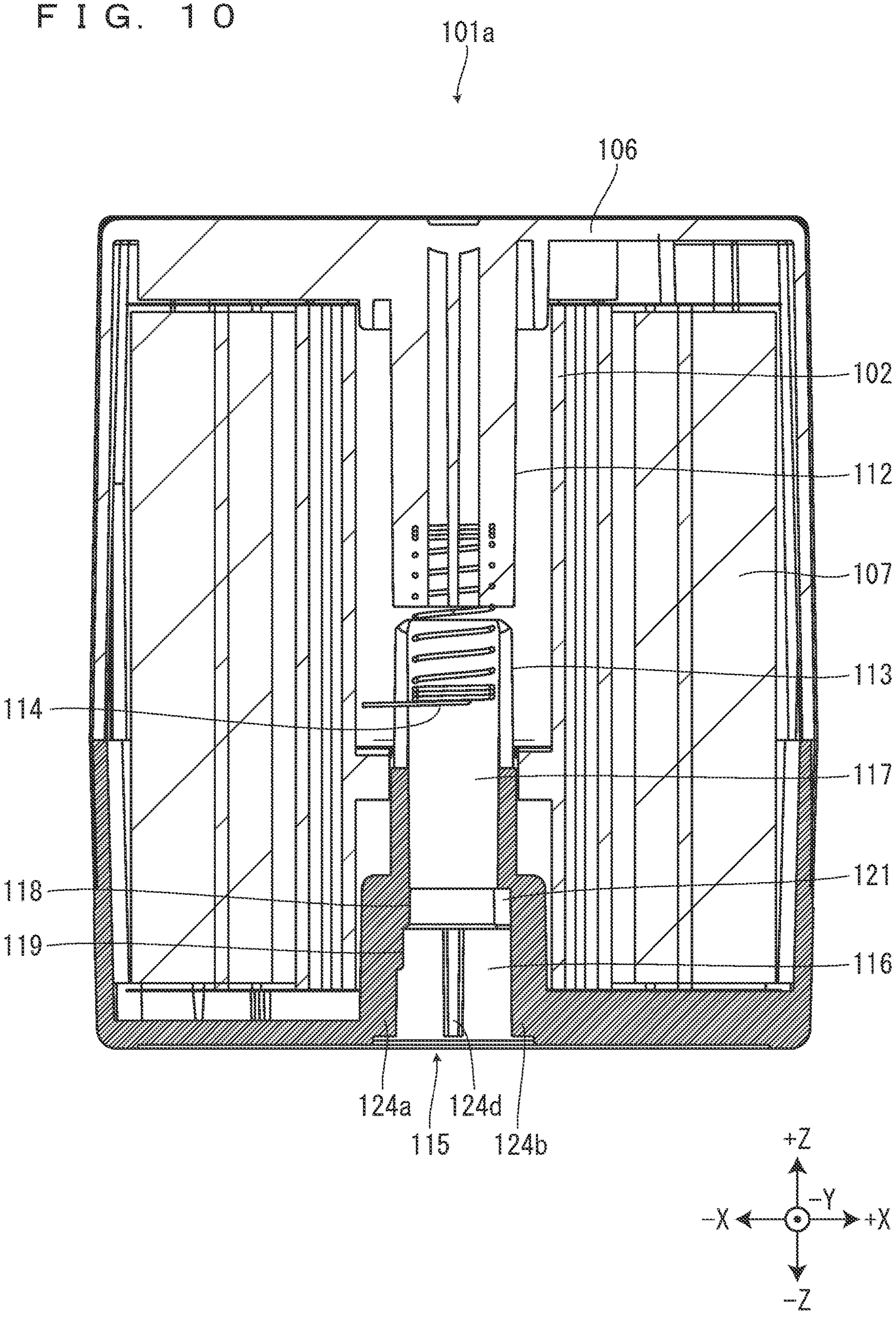
FIG. 10 is a cross-sectional view of the first tape cartridge.

As shown in FIG. 10, the tape cartridge 101 includes a front-side core support shaft 112 that protrudes substantially cylindrically from the inside surface of a wall part on the front side in the installation direction of the first cartridge case 106 to the back side in the installation direction. Further, the tape cartridge 101 includes a back-side core support shaft 113 that protrudes substantially-stepped cylindrically from the inside surface of a wall part on the back side in the installation direction of the first cartridge case 106 to the front side in the installation direction. The front-side core support shaft 112 and the back-side core support shaft 113 are provided to face each other in the Z direction. The front-side core support shaft 112 and the back-side core support shaft 113 rotatably support the tape core 102.

Inside the front-side core support shaft 112 and the back-side core support shaft 113, a reverse rotation prevention spring 114 is provided. The reverse rotation prevention spring 114 is constituted by, for example, a compression coil spring. With its end on the back side in the installation direction engaging the tape core 102, the reverse rotation prevention spring 114 prevents the tape core 102 from reversely rotating in a state in which the tape cartridge 101 is not installed in the cartridge installation part 2. When the tape cartridge 101 is installed in the cartridge installation part 2, the core convex part 5 provided in the cartridge installation part 2 is inserted into the inside of the back-side core support shaft 113 provided in the tape cartridge 101, that is, a core concave part 115. Thus, the reverse rotation prevention spring 114 provided inside the front-side core support shaft 112 and the back-side core support shaft 113 is compressed, and the tape core 102 is allowed to rotate freely when the reverse rotation prevention spring 114 and the tape core 102 disengage from each other.

Figure 11:
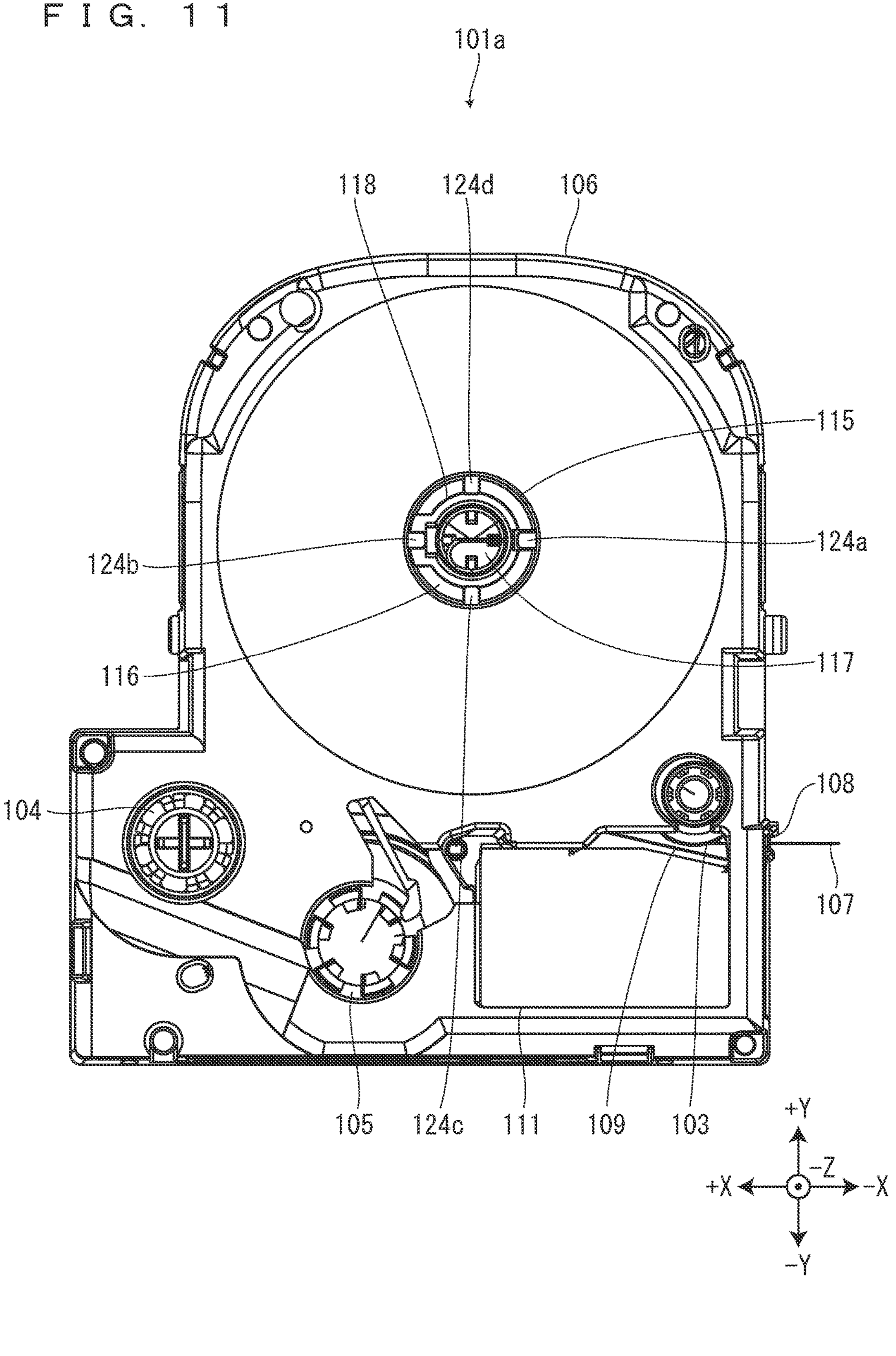
FIG. 11 is a view of the first tape cartridge when seen from a back side in the installation direction.

As shown in FIG. 11, the core concave part 115 is provided to be depressed on the front side in the installation direction on the outside surface of the wall part on the back side in the installation direction of the first cartridge case 106. The core concave part 115 is constituted by the internal space of the back-side core support shaft 113. The core concave part 115 includes a seat concave part 116 on the back side in the installation direction and an insertion concave part 117 on the front side in the installation direction. The seat concave part 116 is depressed substantially circularly from the outside surface of the wall part on the back side in the installation direction of the first cartridge case 106. The insertion concave part 117 is depressed substantially circularly to have a diameter smaller than that of the seat concave part 116 from the bottom surface of the seat concave part 116. Inside the seat concave part 116, an annular convex part 118 that protrudes from the inner peripheral surface of the insertion concave part 117 to the back side in the installation direction is provided.

Figure 12:
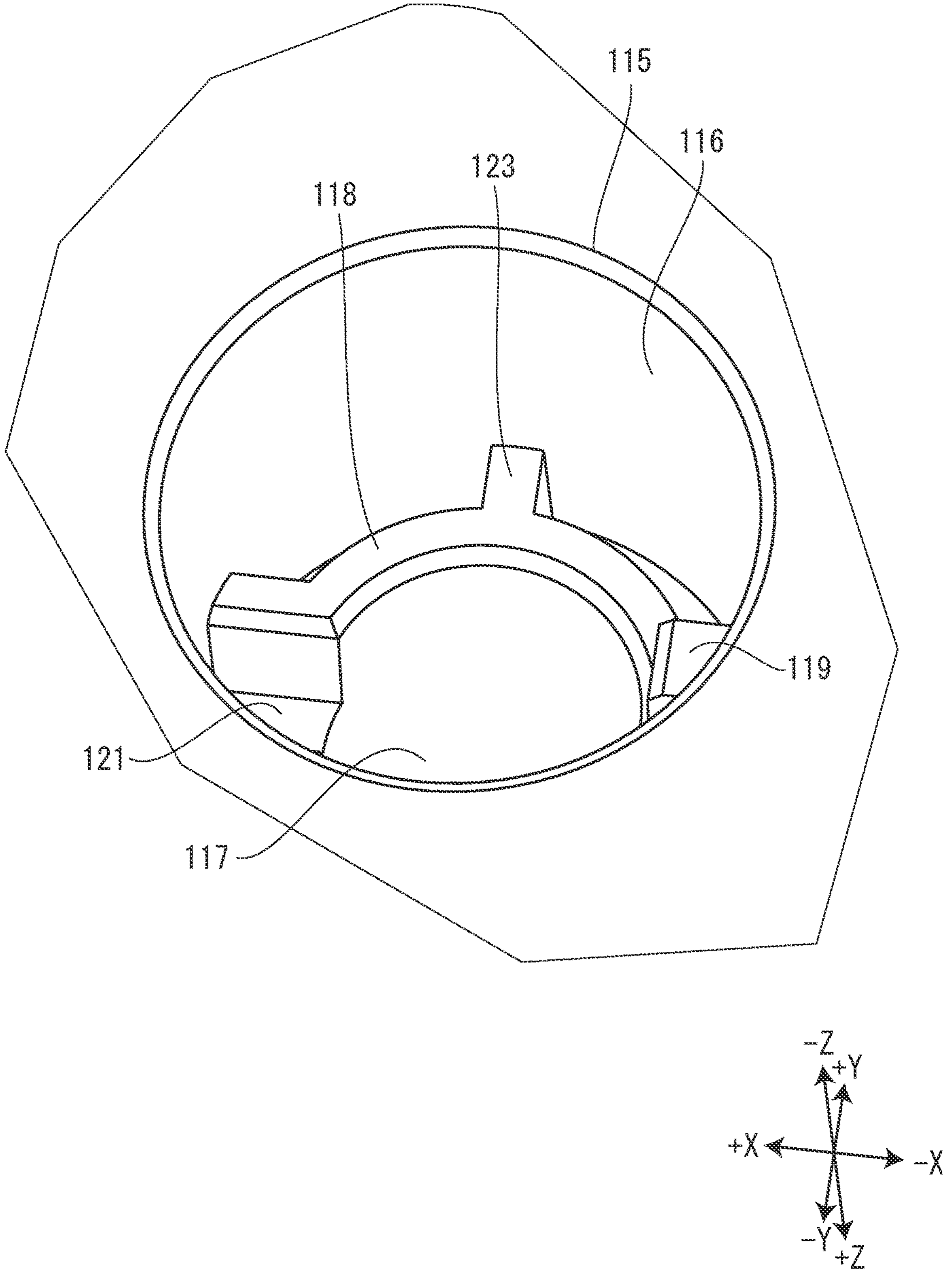
FIG. 12 is a partially-enlarged perspective view of the second tape cartridge showing a core concave part.

Here, the first tape cartridge 101*a* and the second tape cartridge 101*b* are different from each other in a structure inside the seat concave part 116. That is, in the second tape cartridge 101*b*, a connection convex part 119 on a −X side, a connection concave part 121 on the +X side, a first connection part on the −Y side (omitted in the figure), and a second connection part 123 on the +Y side are provided to connect the outer peripheral surface of the annular convex part 118 and the inner peripheral surface of the seat concave part 116 to each other as shown in FIG. 12. The connection convex part 119, the connection concave part 121, the first connection part, and the second connection part 123 are provided at a substantially even interval in the circumferential direction of the seat concave part 116. The arrangement of the connection convex part 119, the connection concave part 121, the first connection part, and the second connection part 123 is not limited to the above configuration. For example, the connection convex part 119 may be arranged on the −Y side, the connection concave part 121 may be arranged on the +Y side, the first connection part may be arranged on the +X side, and the second connection part 123 may be arranged on the −X side. With a change in the arrangement of the connection convex part 119, the connection concave part 121, the first connection part, and the second connection part 123, the second tape cartridge 101*b* can be used for discrimination or the like, for example, when the specifications of the first printing tape 107 are different depending on a country or an area in which the second tape cartridge 101*b* is to be sold.

Figure 13:
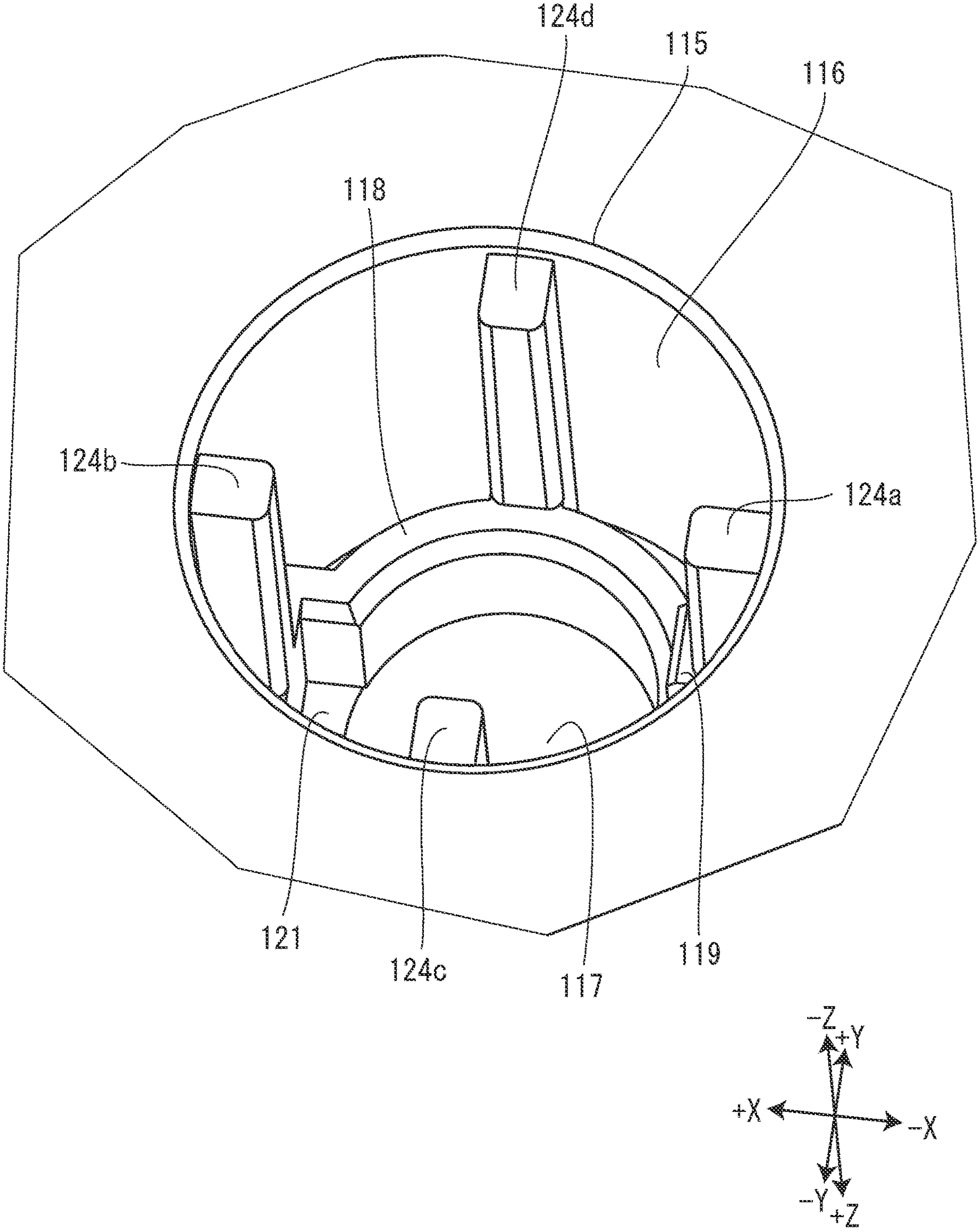
FIG. 13 is a partially-enlarged perspective view of the first tape cartridge showing a core concave part.

On the other hand, in the first tape cartridge 101*a*, four cartridge-side engagement parts 124 are positioned on the back side in the installation direction of a connection convex part 119, a connection concave part 121, a first connection part, and a second connection part 123 and provided to protrude from the inner peripheral surface of a seat concave part 116 as shown in FIG. 13. That is, the first tape cartridge 101*a* and the second tape cartridge 101*b* are different from each other in the presence or absence of the four cartridge-side engagement parts 124. With the provision of the cartridge-side engagement parts 124 on the inner peripheral surface of the seat concave part 116, the breakage of the cartridge-side engagement parts 124 can be prevented even when the first tape cartridge 101*a* drops.

The four cartridge-side engagement parts 124 are provided at a substantially even interval in the circumferential direction of the seat concave part 116. The cartridge-side engagement parts 124 extend to the front side in the installation direction toward the bottom surface of the seat concave part 116 from the vicinity of the opening part of the seat concave part 116. Among the four cartridge-side engagement parts 124, a cartridge-side engagement part 124 on the −X side will be called a cartridge-side first engagement part 124*a*, a cartridge-side engagement part 124 on the +X side will be called a cartridge-side second engagement part 124*b*, a cartridge-side engagement part 124 on the −Y side will be called a cartridge-side third engagement part 124*c*, and a cartridge-side engagement part 124 on the +Y side will be called a cartridge-side fourth engagement part 124*d*. These cartridge-side engagement parts will be simply called the cartridge-side engagement parts 124 when they are not required to be distinguished from each other. As shown in FIG. 11, the cartridge-side first engagement part 124*a* and the cartridge-side second engagement part 124*b* are provided at positions at which the cartridge-side first engagement part 124*a* and the cartridge-side second engagement part 124*b* are in point symmetry with respect to the center of the core concave part 115 when seen from the back side in the installation direction. Similarly, the cartridge-side third engagement part 124*c* and the cartridge-side fourth engagement part 124*d* are provided at positions at which the cartridge-side third engagement part 124*c* and the cartridge-side fourth engagement part 124*d* are in point symmetry with respect to the center of the core concave part 115 when seen from the back side in the installation direction. The cartridge-side first engagement part 124*a* is provided corresponding to a device-side first engagement part 49*a* (see FIG. 15) that will be described later, and the cartridge-side second engagement part 124*b* is provided corresponding to a device-side second engagement part 49*b* (see FIG. 15) that will be described later.

[Core Convex Part]

Figure 14:
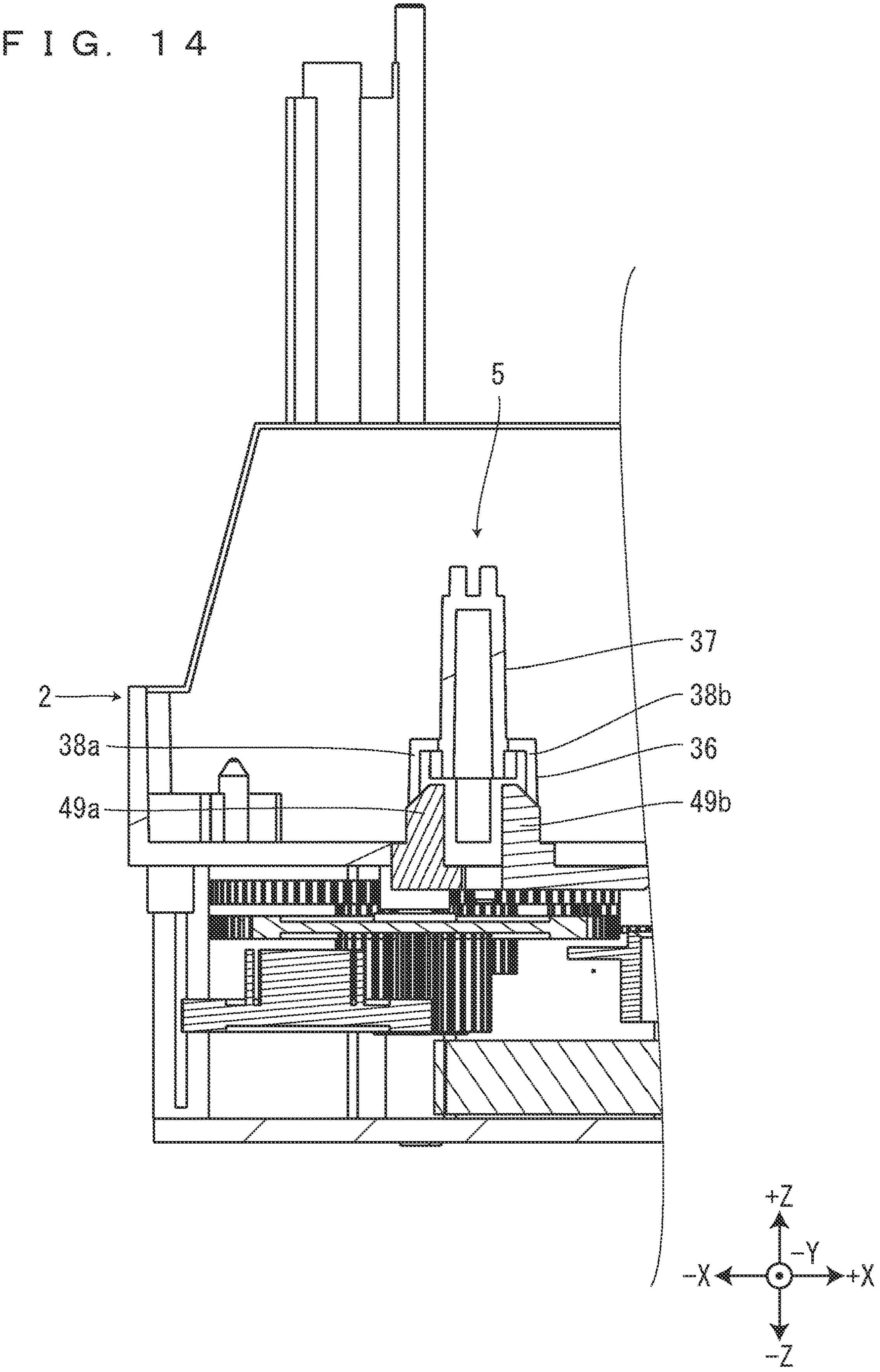
FIG. 14 is a partially-enlarged cross-sectional view of the tape printing device in a state in which both the tape cartridge and the ribbon cartridge are not installed in the cartridge installation part.

As shown in FIGS. 3, 4, and 14, the core convex part 5 is formed into a substantially stepped cylindrical shape as a whole and includes a seat convex part 36 on the back side in the installation direction and an insertion convex part 37 on the front side in the installation direction. The seat convex part 36 protrudes substantially cylindrically from the bottom surface of the cartridge installation part 2. The insertion convex part 37 protrudes substantially cylindrically to have a diameter smaller than that of the seat convex part 36 from the tip end surface of the seat convex part 36.

The seat convex part 36 is provided with four seat opening parts 38. The respective seat opening parts 38 are formed so as to cut off the corner part between the tip end surface and the peripheral surface of the seat convex part 36. The four seat opening parts 38 are provided at a substantially even interval in the circumferential direction of the seat convex part 36. Hereinafter, among the four seat opening parts 38, a seat opening part 38 on the −X side will be called a first seat opening part 38*a*, a seat opening part 38 on the +X side will be called a second seat opening part 38*b*, a seat opening part 38 on the −Y side will be called a third seat opening part 38*c*, and a seat opening part 38 on the +Y side will be called a fourth seat opening part 38*d*. These seat opening parts will be simply called the seat opening parts 38 when they are not required to be distinguished from each other. As shown in FIG. 3, the first seat opening part 38*a* and the second seat opening part 38*b* are provided at positions at which the first seat opening part 38*a* and the second seat opening part 38*b* are in point symmetry with respect to the center of the core convex part 5 when seen from the front side in the installation direction. Similarly, the third seat opening part 38*c* and the fourth seat opening part 38*d* are provided at positions at which the third seat opening part 38*c* and the fourth seat opening part 38*d* are in point symmetry to each other with respect to the center of the core convex part 5 when seen from the front side in the installation direction.

Figure 15:
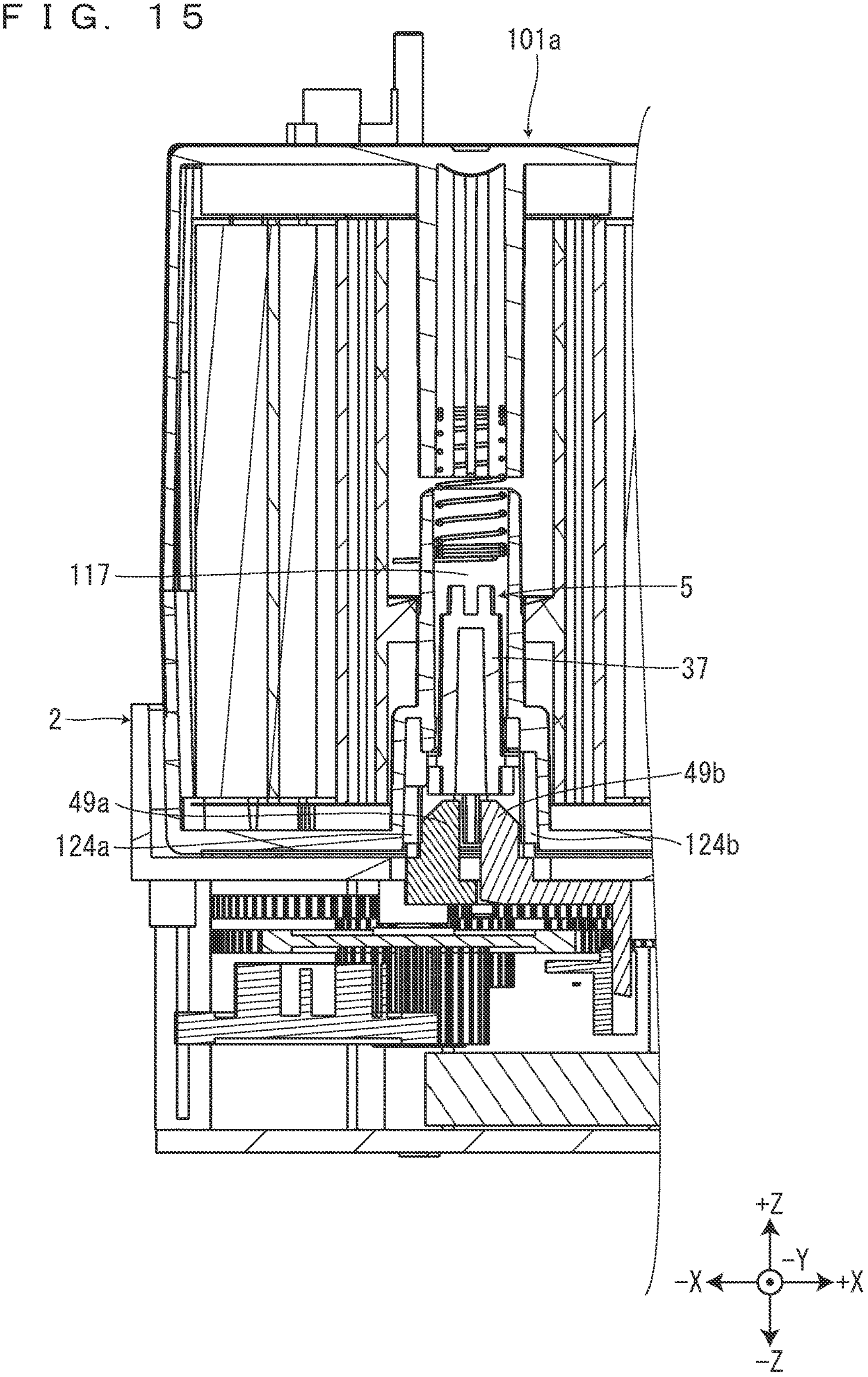
FIG. 15 is a partially-enlarged cross-sectional view of the tape printing device in a state in which the first tape cartridge is installed in the cartridge installation part.
Figure 16:
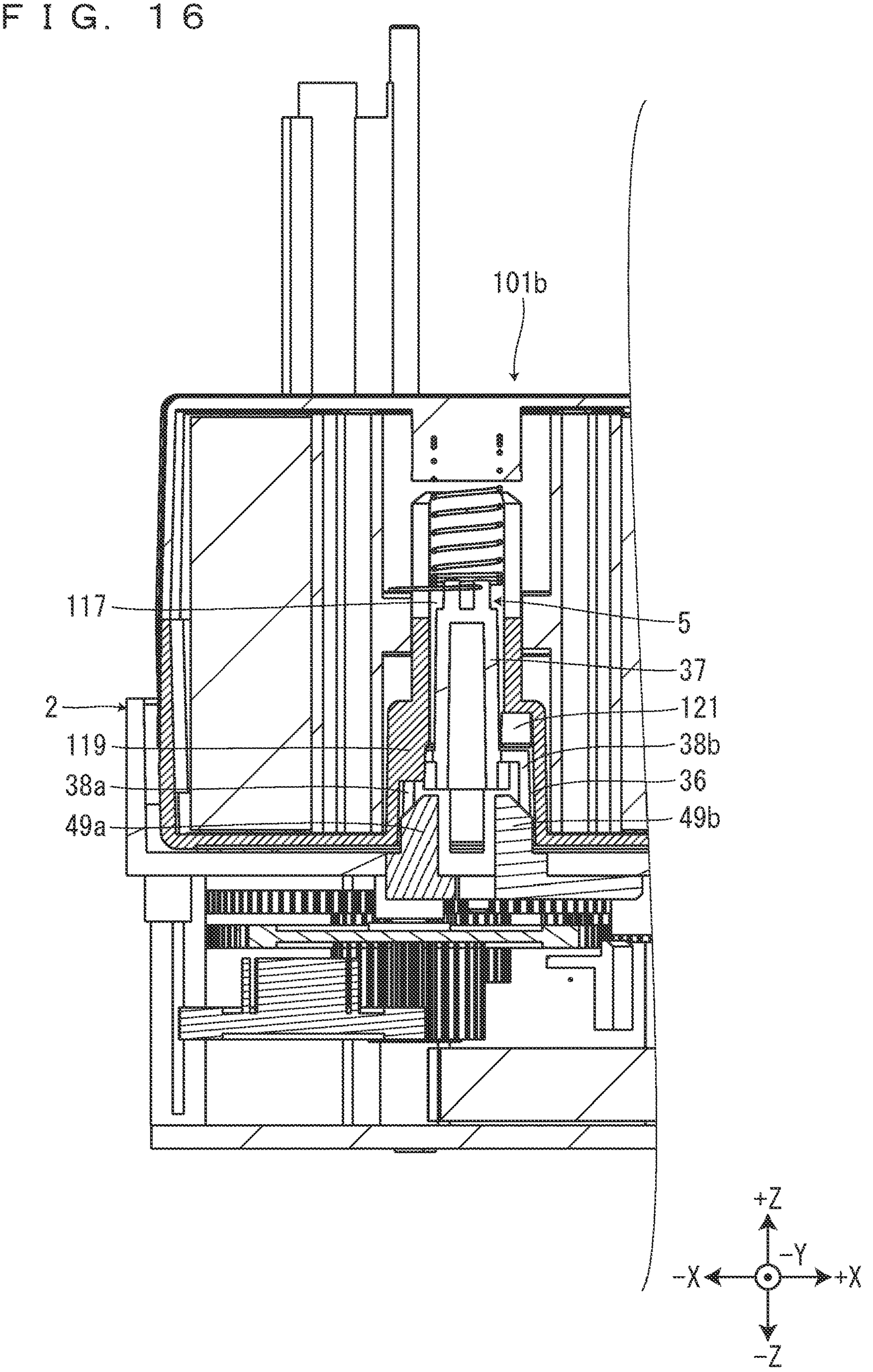
FIG. 16 is a partially-enlarged cross-sectional view of the tape printing device in a state in which the second tape cartridge is installed in the cartridge installation part.

As shown in FIGS. 15 and 16, the core convex part 5 provided in the cartridge installation part 2 is inserted into the core concave part 115 provided in the tape cartridge 101 from the back side in the installation direction when the tape cartridge 101 is installed in the cartridge installation part 2. That is, the seat convex part 36 is inserted into the seat concave part 116, and the insertion convex part 37 is inserted into the insertion concave part 117.

Here, as shown in FIG. 15, the cartridge-side engagement parts 124 provided on the inner peripheral surface of the seat concave part 116 enter the seat convex part 36 via the seat opening parts 38 when the first tape cartridge 101*a* is installed in the cartridge installation part 2. Thus, among the four cartridge-side engagement parts 124, the cartridge-side first engagement part 124*a* and the cartridge-side second engagement part 124*b* engage the device-side first engagement part 49*a* and the device-side second engagement part 49*b* that will be descried later, respectively. Further, as shown in FIG. 14, the cartridge-side engagement parts 124 leave the seat convex part 36 via the seat opening parts 38 when the first tape cartridge 101*a* is removed from the cartridge installation part 2. Thus, the cartridge-side first engagement part 124*a* and the cartridge-side second engagement part 124*b* disengage from the device-side first engagement part 49*a* and the device-side second engagement part 49*b*, respectively.

On the other hand, as shown in FIG. 16, the seat concave part 116 does not engage the device-side first engagement part 49*a* and the device-side second engagement part 49*b* when the second tape cartridge 101*b* that does not have the cartridge-side engagement parts 124 is installed in the cartridge installation part 2.

[First Torque Switching Mechanism]

The first torque switching mechanism 31 is used to switch a torque to be transmitted to the first winding rotation element 16 from the second torque to the first torque larger than the second torque when the first tape cartridge 101*a* is installed in the cartridge installation part 2. That is, when the first tape cartridge 101*a* in which the first ink ribbon 109 having a wide width is installed in the cartridge installation part 2, the torque to be transmitted to the first winding rotation element 16 is switched to the first torque larger than the second torque by the first torque switching mechanism 31. Therefore, the first ink ribbon 109 having a wide width and held together with the first printing tape 107 between the printing head 6 and the first platen roller 103 can be properly separated from the first printing tape 107 and wound up. On the other hand, when the second tape cartridge 101*b* in which the first ink ribbon 109 having a narrow width is installed, the first torque switching mechanism 31 does not switch the torque from a state in which the tape cartridge 101 is not installed, and the torque to be transmitted to the first winding rotation element 16 is the second torque smaller than the first torque. Therefore, the breakage of the first ink ribbon 109 having a narrow width can be suppressed.

Figure 17:
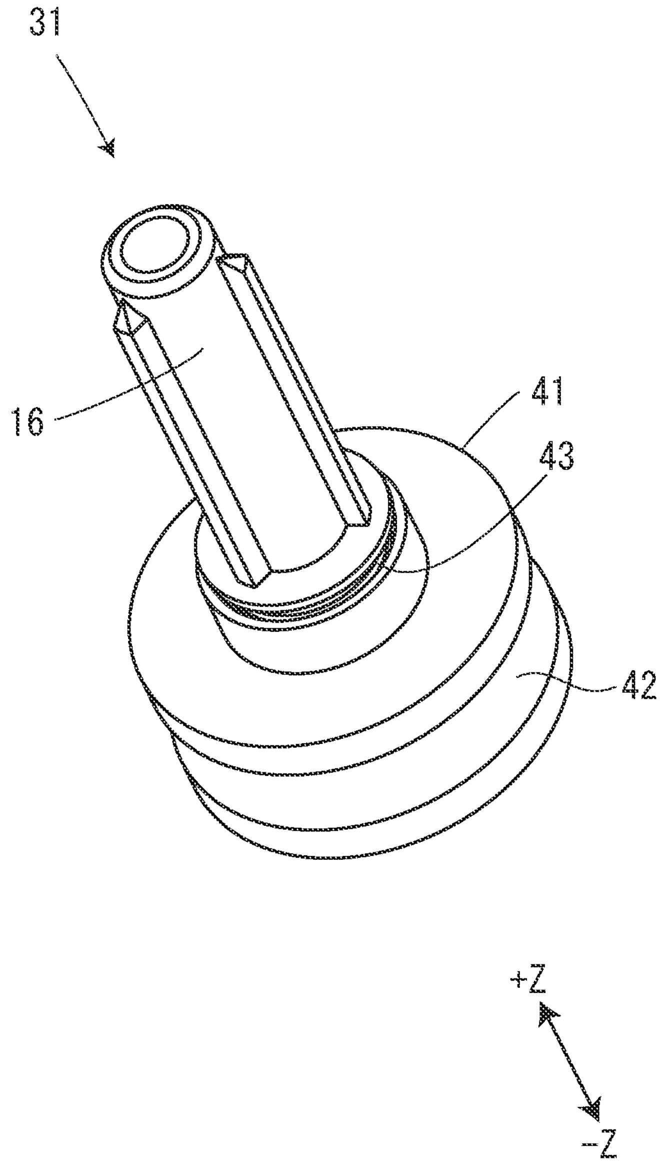
FIG. 17 is a perspective view about a first winding rotation element.
Figure 18:
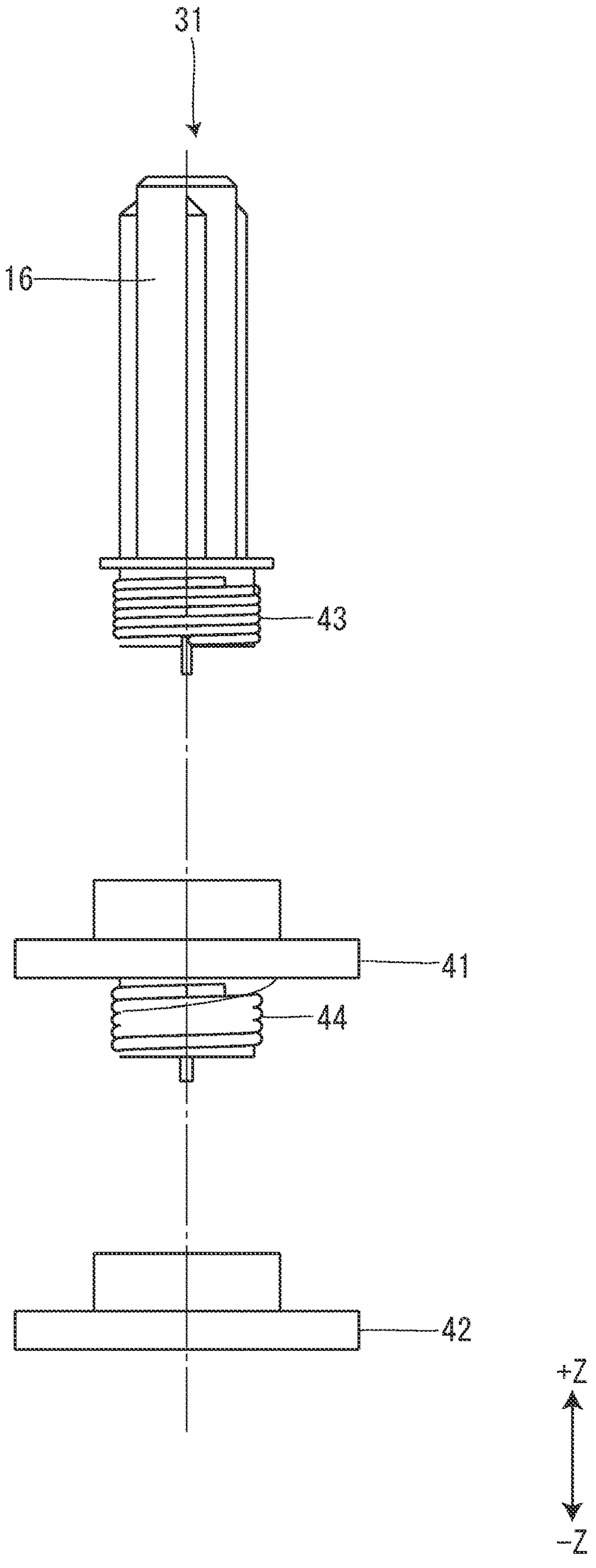
FIG. 18 is an exploded view about the first winding rotation element.

As shown in FIGS. 17 and 18, the first torque switching mechanism 31 includes a first winding gear 41, a second winding gear 42, a first slip spring 43, and a second slip spring 44. Further, the first torque switching mechanism 31 includes a movable gear 46 that will be described later, two switching operation elements 47, and gear support part 48 (see FIGS. 19 and 20).

The first winding gear 41 is rotatably supported by the first winding shaft 11. That is, the first winding gear 41 is positioned on a further back side in the installation direction than the first winding rotation element 16 and provided to be coaxial with the first winding rotation element 16. The first winding gear 41 is connected to the first winding rotation element 16 via the first slip spring 43 and rotates the first winding rotation element 16.

The second winding gear 42 is rotatably supported by the first winding shaft 11. That is, the second winding gear 42 is positioned on a further back side in the installation direction than the first winding gear 41 and provided to be coaxial with the first winding rotation element 16. The second winding gear 42 is connected to the first winding gear 41 via the second slip spring 44 and rotates the first winding rotation element 16 via the first winding gear 41.

The first slip spring 43 is provided between the first winding gear 41 and the first winding rotation element 16. The first slip spring 43 limits the torque to be transmitted from the first winding gear 41 to the first winding rotation element 16 to the first torque. The second slip spring 44 is provided between the second winding gear 42 and the first winding gear 41. The second slip spring 44 limits the torque to be transmitted from the second winding gear 42 to the first winding gear 41 to the second torque smaller than the first torque. Note that the torque to be transmitted from the second winding gear 42 to the first winding gear 41 is further transmitted to the first winding rotation element 16 via the first slip spring 43 since the torque does not exceed the first torque. Note that the first slip spring 43 is an example of a "first torque limiter." The second slip spring 44 is an example of a "second torque limiter."

The movable gear 46 engages and disengages from the first winding gear 41, while the first-winding-side second gear 29 meshes with the second winding gear 42 at all times. Therefore, when the movable gear 46 meshes with the first winding gear 41 and the rotation of the feeding motor 20 is input to the first winding gear 41 via the movable gear 46, the torque to be transmitted to the first winding rotation element 16 is limited to the first toque by the first slip spring 43. On the other hand, when the movable gear 46 disengages from the first winding gear 41 and the rotation of the feeding motor 20 is input to the first winding gear 41 via the second winding gear 42, the torque to be transmitted to the first winding rotation element 16 is limited to the second torque by the second slip spring 44.

Figure 19:
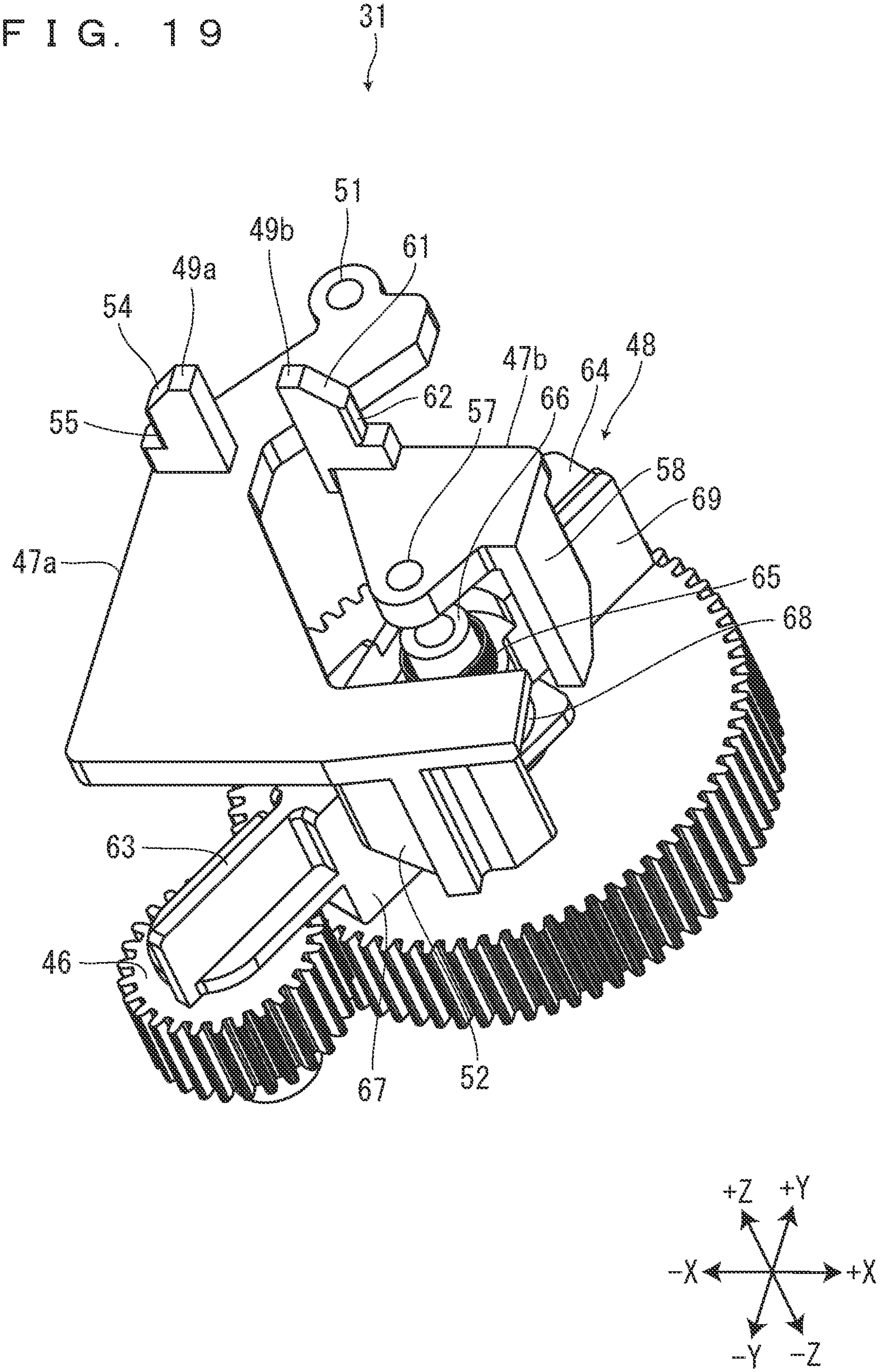
FIG. 19 is a perspective view of a first torque switching mechanism.
Figure 20:
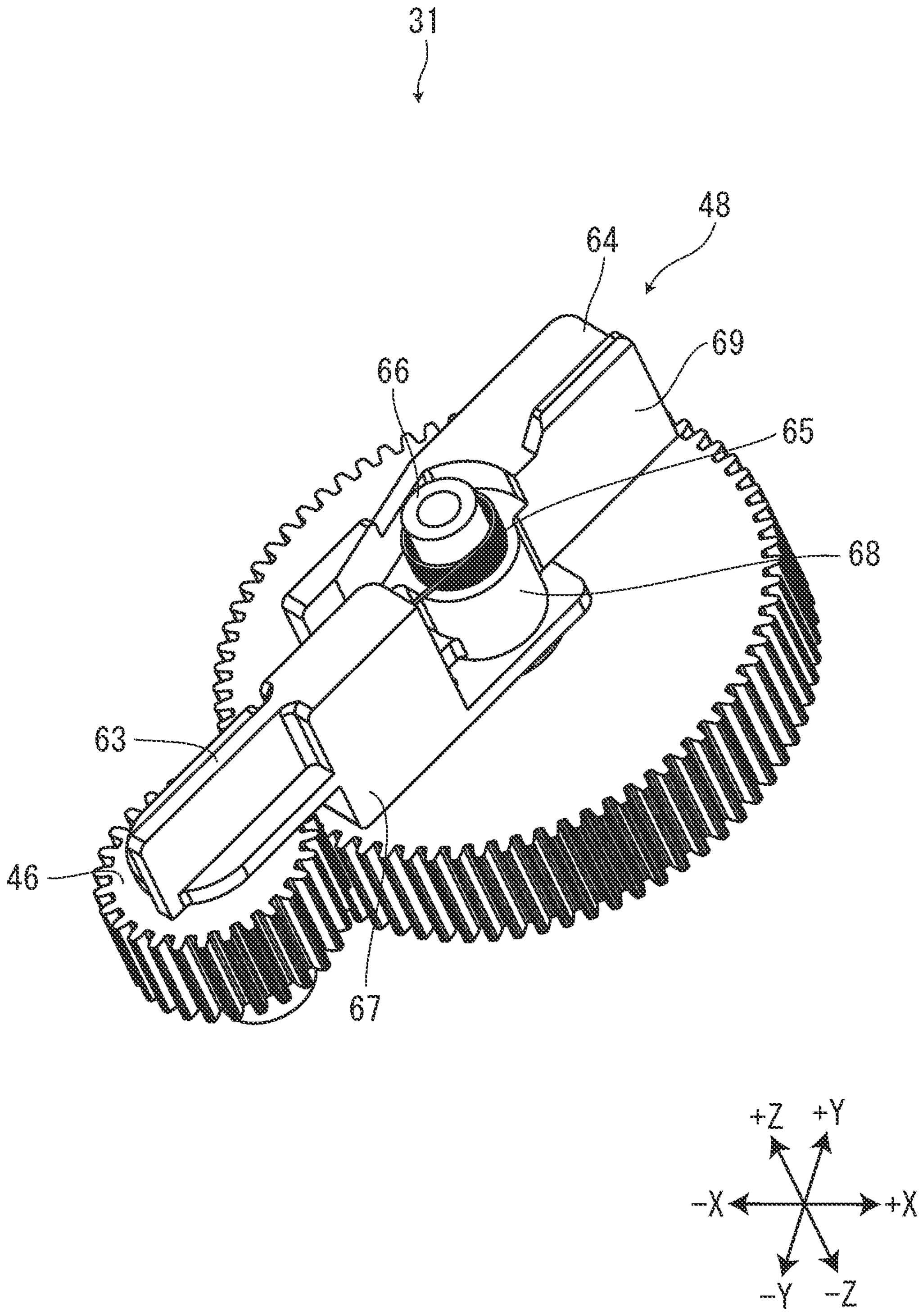
FIG. 20 is a perspective view of the first torque switching mechanism excluding a first switching operation element and a second switching operation element.

As shown in FIGS. 19 and 20, the movable gear 46 is rotatably supported by the gear support part 48 and configured to engage and disengage from the first winding gear 41. Further, the movable gear 46 meshes with the first-winding-side first gear 28 at all times (see FIGS. 6 and 7).

The respective switching operation elements 47 are provided with device-side engagement parts 49 that engage the cartridge-side engagement parts 124 when the first tape cartridge 101*a* is installed in the cartridge installation part 2. Here, among the two device-side engagement parts 49, a device-side engagement part 49 on the −X side will be called a device-side first engagement part 49*a*, and a device-side engagement part 49 on the +X side will be called a device-side second engagement part 49*b*. The device-side first engagement part 49*a* and the device-side second engagement part 49*b* will be simply called the device-side engagement parts 49 when they are not required to be distinguished from each other. Further, among the two switching operation elements 47, a switching operation element 47 provided with the device-side first engagement part 49*a* will be called a first switching operation element 47*a*, and a switching operation element 47 provided with the device-side second engagement part 49*b* will be called a second switching operation element 47*b*. The first switching operation element 47*a* and the second switching operation element 47*b* will be simply called the switching operation elements 47 when they are not required to be distinguished from each other.

The first switching operation element 47*a* is rotatably provided about an operation element shaft omitted in the figures. The first switching operation element 47*a* is formed into a substantially "L"-shape when seen from the front side in the installation direction. At the end on the +Y side of the first switching operation element 47*a*, a first-operation-element-side shaft insertion part 51 into which the first operation element shaft (omitted in the figures) is inserted is provided. At the end on the +X side of the first switching operation element 47*a*, a first-operation-element-side engagement part 52 that protrudes to the back side in the installation direction is provided. The first-operation-element-side engagement part 52 engages a support-part-side first engagement part 67 that will be described later. The device-side first engagement part 49*a* is positioned on the −X side and the −Y side of the first-operation-element-side shaft insertion part 51 and protrudes to the front side in the installation direction. The device-side first engagement part 49*a* is provided with a first engagement inclination surface 54 that is inclined with the back side in the installation direction directed to the −X side and a first operation surface 55 that extends to the back side in the installation direction from the end on the back side in the installation direction of the first engagement inclination surface 54.

A force is applied to the first switching operation element 47*a* by an operation element spring 56 (see FIG. 6) in a direction in which the first switching operation element 47*a* rotates clockwise. One end of the operation element spring 56 is retained at the support shaft (omitted in the figures) of the first-winding-side second gear 29, and the other end thereof is retained at the end on the +X side of the first switching operation element 47*a*. A torsion coil spring can be, for example, used as the operation element spring 56. Note that the clockwise direction indicates a clockwise direction when seen from the front side in the installation direction. Similarly, a counterclockwise direction indicates a counterclockwise direction when seen from the front side in the installation direction.

The second switching operation element 47*b* is rotatably provided about a second operation element shaft (not shown in the figures). The second switching operation element 47*b* is formed into a substantially triangular shape when seen from the front side in the installation direction. At the end on the −Y side of the second switching operation element 47*b*, a second-operation-element-side shaft insertion part 57 into which the second operation element shaft is inserted is provided. Further, the second switching operation element 47*b* is provided with a second-operation-element-side engagement part 58 that is positioned on the +X side and the +Y side of the second-operation-element-side shaft insertion part 57 and protrudes to the back side in the installation direction. The second-operation-element-side engagement part 58 engages a support-part-side second engagement part 69 that will be described later. The device-side second engagement part 49*b* is positioned on the −X side and the +Y side of the second-operation-element-side shaft insertion part 57 and protrudes to the front side in the installation direction. The device-side second engagement part 49*b* is provided with a second engagement inclination surface 61 that is inclined with the back side in the installation direction directed to the +X side and a second operation surface 62 that extends to the back side in the installation direction from the end on the back side in the installation direction of the second engagement inclination surface 61. Note that inclination surfaces may be provided at the cartridge-side first engagement part 124*a* and the cartridge-side second engagement part 124*b* instead of the first engagement inclination surface 54 and the second engagement inclination surface 61.

As shown in FIG. 14, the device-side first engagement part 49*a* and the device-side second engagement part 49*b* are provided inside the seat convex part 36. That is, the device-side first engagement part 49*a* and the device-side second engagement part 49*b* are provided on the back side in the installation direction with respect to the first seat opening part 38*a* and the second seat opening part 38*b*, respectively. The device-side first engagement part 49*a* and the device-side second engagement part 49*b* are provided corresponding to the cartridge-side first engagement part 124*a* and the cartridge-side second engagement part 124*b*, respectively. The device-side first engagement part 49*a* and the device-side second engagement part 49*b* engage the cartridge-side first engagement part 124*a* and the cartridge-side second engagement part 124*b*, respectively, substantially simultaneously when the first tape cartridge 101*a* is installed in the cartridge installation part 2. Further, the device-side first engagement part 49*a* and the device-side second engagement part 49*b* are provided at positions at which the device-side first engagement part 49*a* and the device-side second engagement part 49*b* are in point symmetry with respect to the center of the core convex part 5 when seen from the front side in the installation direction (see FIG. 3).

As shown in FIGS. 6, 7, 19, and 20, the gear support part 48 is configured to be rotatable so that the rotatably-supported movable gear 46 contacts and separates from the first winding gear 41. The gear support part 48 includes a first-operation-element-side support member 63, a second-operation-element-side support member 64, and a support part spring 65.

The first-operation-element-side support member 63 is rotatably provided about a clutch shaft 45 (see FIG. 5) provided to be substantially coaxial with the second operation element shaft. At the end on the +Y side of the first-operation-element-side support member 63, a support-part-side first shaft insertion part 66 into which the clutch shaft 45 is inserted is provided to be substantially cylindrically. At the end on the −Y side of the first-operation-element-side support member 63, the movable gear 46 is rotatably supported. At the substantially intermediate part of the first-operation-element-side support member 63, the support-part-side first engagement part 67 is provided. The support-part-side first engagement part 67 engages the first-operation-element-side engagement part 52.

The second-operation-element-side support member 64 is rotatably provided about the clutch shaft 45. At the substantially intermediate part of the second-operation-element-side support member 64, a support-part-side second shaft insertion part 68 into which the clutch shaft 45 is inserted is provided to be formed into a substantially short cylindrical shape. The support-part-side first shaft insertion part 66 is inserted into the support-part-side second shaft insertion part 68 from the back side in the installation direction. At the end on the +Y side of the second-operation-element-side support member 64, a support-part-side second engagement part 69 is provided. The support-part-side second engagement part 69 engages the second-operation-element-side engagement part 58.

The support part spring 65 elastically connects the first-operation-element-side support member 63 and the second-operation-element-side support member 64 to each other. The support part spring 65 is provided on the clutch shaft 45. One end of the support part spring 65 is retained at the first-operation-element-side support member 63, and the other end thereof is retained at the second-operation-element-side support member 64. When the first-operation-element-side support member 63 is fixed, the support part spring 65 applies a force to the second-operation-element-side support member 64 so that the second-operation-element-side support member 64 rotates clockwise. A torsion coil spring can be, for example, used as the support part spring 65. Note that the support part spring 65 is an example of an "elastic member."

[State Change of First Torque Switching Mechanism]

When the first tape cartridge 101*a* is installed in the cartridge installation part 2, the cartridge-side first engagement part 124*a* and the cartridge-side second engagement part 124*b* engage the device-side first engagement part 49*a* and the device-side second engagement part 49*b*, respectively, as described above (see FIG. 15).

Figure 21:
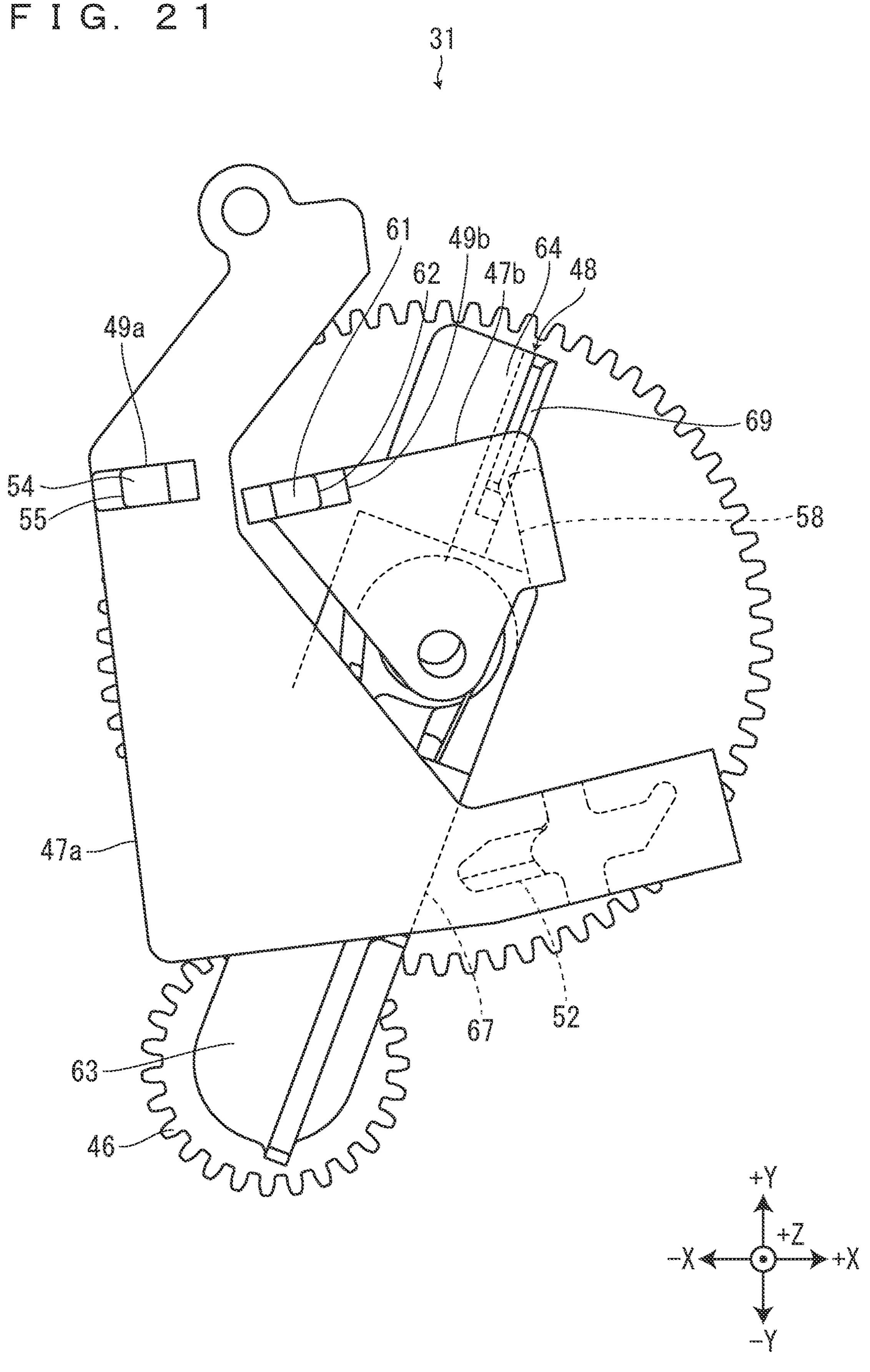
FIG. 21 is a view of the first torque switching mechanism when seen from the front side in the installation direction in a state in which the first tape cartridge is installed.

At this time, the cartridge-side first engagement part 124*a* engages the device-side first engagement part 49*a* in the order of the first engagement inclination surface 54 and the first operation surface 55. Thus, the device-side first engagement part 49*a* is pressed to the +X side. As a result, the first switching operation element 47*a* rotates counterclockwise against the elastic force of the operation element spring 56 as shown in FIG. 21 from a state shown in FIG. 22. At this time, the first-operation-element-side engagement part 52 of the first switching operation element 47*a* moves to the +X side. Therefore, the support-part-side first engagement part 67 engaging the first operation-element-side engagement part 52 on the −X side of the first-operation-element-side engagement part 52 becomes movable to the +X side. Thus, the first-operation-element-side support member 63 becomes rotatable counterclockwise, that is, in a direction in which the movable gear 46 supported by the first-operation-element-side support member 63 comes close to the first winding gear 41. When the cartridge-side first engagement part 124*a* engages the device-side first engagement part 49*a* as described above, the first switching operation element 47*a* rotates counterclockwise, whereby the first-operation-element-side support member 63 is allowed to rotate counterclockwise.

Further, the cartridge-side second engagement part 124*b* engages the device-side second engagement part 49*b* in the order of the second engagement inclination surface 61 and the second operation surface 62. Thus, the device-side second engagement part 49*b* is pressed to the −X side. As a result, the second switching operation element 47*b* rotates counterclockwise as shown in FIG. 21 from the state shown in FIG. 22. At this time, the second-operation-element-side engagement part 58 of the second switching operation element 47*b* presses the support-part-side second engagement part 69 of the second-operation-element-side support member 64 to the −X side. Therefore, the second-operation-element-side support member 64 rotates counterclockwise. When the second-operation-element-side support member 64 rotates counterclockwise, the first-operation-element-side support member 63 elastically connected to the second-operation-element-side support member 64 via the support part spring 65 rotates counterclockwise, that is, in a direction in which the movable gear 46 supported by the first-operation-element-side support member 63 comes close to the first winding gear 41. As a result, the movable gear 46 meshes with the first winding gear 41 as shown in FIG. 6. When the cartridge-side second engagement part 124*b* engages the device-side second engagement part 49*b* as described above, the second switching operation element 47*b* rotates counterclockwise to cause the first-operation-element-side support member 63 to rotate counterclockwise.

Here, the first-operation-element-side support member 63 and the second-operation-element-side support member 64 are elastically connected to each other by the support part spring 65. Therefore, even after the second-operation-element-side support member 64 rotates by a meshing rotation amount θ counterclockwise and the movable gear 46 meshes with the first winding gear 41 from the state shown in FIG. 22, the second-operation-element-side support member 64 becomes further rotatable by an additional rotation amount α counterclockwise against the elastic force of the support part spring 65 with respect to the first-operation-element-side support member 63. Here, the meshing rotation amount θ indicates the minimum value of the rotation amount of the second-operation-element-side support member 64 required when the movable gear 46 meshes with the first winding gear 41. Therefore, if the rotation amount of the second-operation-element-side support member 64 is the meshing rotation amount θ or more and the sum (θ+α) of the meshing rotation amount θ and the additional rotation amount α or less, the movable gear 46 is pressed to the first winding gear 41 by an appropriate load. Accordingly, the design value of the rotation amount of the second-operation-element-side support member 64 is only required to set at a value larger than θ and smaller than (θ+α). Thus, even if the rotation amount of the second-operation-element-side support member 64 fluctuates due to a dimensional fluctuation in the cartridge-side second engagement part 124*b* or the like, the movable gear 46 can properly mesh with the first winding gear 41 with the proviso that the value is θ or more and (θ+α) or less. That is, the dimensional fluctuation in the cartridge-side second engagement part 124*b* or the like can be absorbed by the support part spring 65.

As described above, the cartridge-side first engagement part 124*a* and the cartridge-side second engagement part 124*b* engage device-side first engagement part 49*a* and the device-side second engagement part 49*b*, respectively, when the first tape cartridge 101*a* is installed in the cartridge installation part 2. Thus, the gear support part 48 rotates counterclockwise, and the movable gear 46 meshes with the first winding gear 41. As a result, the first torque switching mechanism 31 changes its state to a state in which the rotation of the feeding motor 20 is input to the first winding gear 41 via the movable gear 46, that is, the first state in which the torque to be transmitted to the first winding rotation element 16 is set at the first torque.

Next, the state change of the first torque switching mechanism 31 during the removal of the first tape cartridge 101*a* will be described. When the first tape cartridge 101*a* is removed from the cartridge installation part 2, the cartridge-side first engagement part 124*a* and the cartridge-side second engagement part 124*b* disengage from the device-side first engagement part 49*a* and the device-side second engagement part 49*b*, respectively, as described above.

Figure 22:
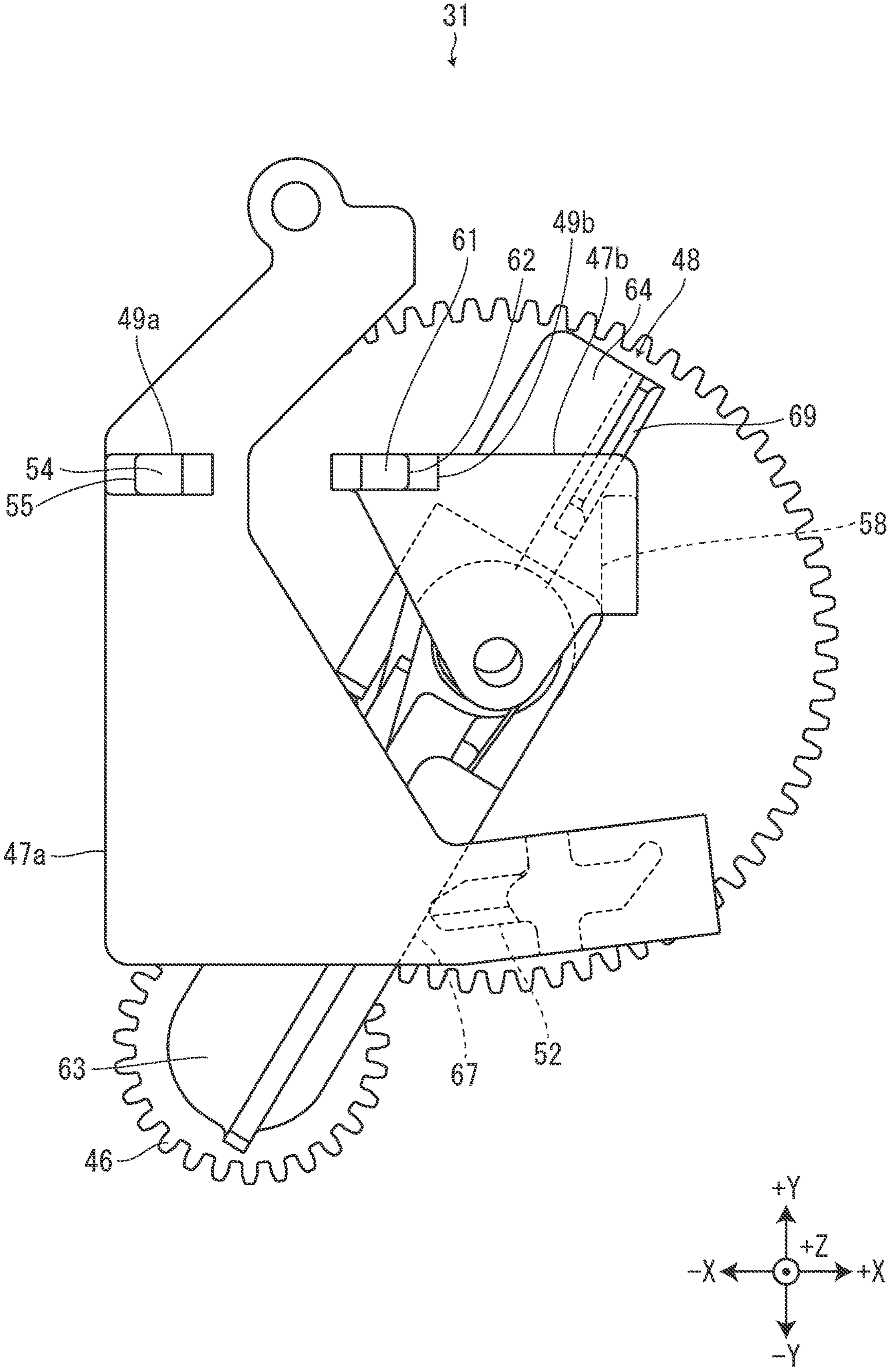
FIG. 22 is a view of the first torque switching mechanism when seen from the front side in the installation direction in a state in which the first tape cartridge is removed.

When the cartridge-side first engagement part 124*a* disengages from the device-side first engagement part 49*a*, the first switching operation element 47*a* rotates clockwise due to the elastic force of the operation element spring 56 as shown in FIG. 22 from the state shown in FIG. 21. Thus, the first-operation-element-side engagement part 52 of the first switching operation element 47*a* presses the support-part-side first engagement part 67 of the first-operation-element-side support member 63 to the −X side. Therefore, the first-operation-element-side support member 63 rotates clockwise, that is, in a direction in which the movable gear 46 supported by the first-operation-element-side support member 63 separates from the first winding gear 41. As a result, the movable gear 46 disengages from the first winding gear 41 as shown in FIG. 7. As described above, the first switching operation element 47*a* rotates clockwise to cause the first-operation-element-side support member 63 to rotate clockwise and prevents the first-operation-element-side support member 63 from rotating counterclockwise when the cartridge-side first engagement part 124*a* disengages from the device-side first engagement part 49*a*.

When the first-operation-element-side support member 63 rotates clockwise, the second-operation-element-side support member 64 elastically connected to the first-operation-element-side support member 63 via the support part spring 65 rotates clockwise. Thus, the support-part-side second engagement part 69 of the second-operation-element-side support member 64 presses the second-operation-element-side engagement part 58 of the second switching operation element 47*b* to the +X side. Since the cartridge-side second engagement part 124*b* disengages from the device-side second engagement part 49*b* as described above at this time, the device-side second engagement part 49*b* becomes movable to the +X side, that is, the second switching operation element 47*b* becomes rotatable clockwise. Therefore, the second switching operation element 47*b* is pressed by the second-operation-element-side support member 64 and rotates clockwise.

As described above, the cartridge-side first engagement part 124*a* and the cartridge-side second engagement part 124*b* disengage from the device-side first engagement part 49*a* and the device-side second engagement part 49*b*, respectively, when the first tape cartridge 101*a* is removed from the cartridge installation part 2. Thus, the gear support part 48 rotates clockwise, and the movable gear 46 disengages from the first winding gear 41. As a result, the first torque switching mechanism 31 changes its state to a state in which the rotation of the feeding motor 20 is input to the first winding gear 41 via the second winding gear 42, that is, the second state in which the torque to be transmitted to the first winding rotation element 16 is set at the second torque.

Note that as described above, the connection convex part 119 and the connection concave part 121 do not engage the device-side first engagement part 49*a* and the device-side second engagement part 49*b*, respectively, when the second tape cartridge 101*b* is installed in the cartridge installation part 2 (see FIG. 16). Therefore, when the second tape cartridge 101*b* is installed in the cartridge installation part 2, the first torque switching mechanism 31 remains in the second state, and the torque to be transmitted to the first winding rotation element 16 remains at the second torque.

As described above, according to the first tape cartridge 101*a* and the tape printing device 1 of the present embodiment, the cartridge-side first engagement part 124*a* and the cartridge-side second engagement part 124*b* engage the device-side first engagement part 49*a* and the device-side second engagement part 49*b*, respectively, when the first tape cartridge 101*a* is installed in the cartridge installation part 2, whereby the first torque switching mechanism 31 changes its state from the second state to the first state. Thus, the torque to be transmitted to the first winding rotation element 16 is switched from the second torque to the first torque. Accordingly, compared with a case in which the first winding rotation element 16 has a double-cylinder structure, the diameter of the first winding core 105 can be reduced and the first tape cartridge 101*a* can be miniaturized. Further, compared with a case in which the first winding rotation element 16 has a double-cylinder structure, the rattling amount of the first winding rotation element 16 with respect to the first winding shaft 11 can be reduced. Therefore, since the center of the first winding core 105 and the center of the first winding shaft 11 can be substantially aligned with each other, the first ink ribbon 109 can be properly wound up by the first winding core 105.

Further, according to the first tape cartridge 101*a* and the tape printing device 1 of the present embodiment, the first tape cartridge 101*a* and the first torque switching mechanism 31 do not engage with each other only at one spot but engage with each other at two spots, that is, the spot between the cartridge-side first engagement part 124*a* and the device-side first engagement part 49*a* and the spot between the cartridge-side second engagement part 124*b* and the device-side second engagement part 49*b*. Therefore, a load by the engagement acts on the first tape cartridge 101*a* in a balanced manner, the first tape cartridge 101*a* is prevented from being inclined with respect to the cartridge installation part 2, and the traveling of the first printing tape 107 and the first ink ribbon 109 can be improved.

Note that the cartridge-side first engagement part 124*a* and the cartridge-side second engagement part 124*b* may not be necessarily arranged in point symmetry with respect to the center of the core concave part 115 like the present embodiment but are only required to be capable of engaging the device-side first engagement part 49*a* and the device-side second engagement part 49*b*, respectively. For example, the dimension between the cartridge-side first engagement part 124*a* and the center of the core concave part 115 may be different from the dimension between the cartridge-side second engagement part 124*b* and the core concave part 115. Further, the cartridge-side first engagement part 124*a*, the center of the core concave part 115, and the cartridge-side second engagement part 124*b* may not be necessarily arranged in a line when seen from the back side in the installation direction. That is, the cartridge-side first engagement part 124*a* and the cartridge-side second engagement part 124*b* are only required to be arranged facing each other across the center of the core concave part 115 so long as the cartridge-side first engagement part 124*a* and the cartridge-side second engagement part 124*b* engage the device-side first engagement part 49*a* and the device-side second engagement part 49*b*, respectively. Further, the shape of the cartridge-side first engagement part 124*a* and the shape of the cartridge-side second engagement part 124*b* arranged facing each other across the center of the core concave part 115 when seen from the back side in the installation direction may be different from each other. Similarly, the device-side first engagement part 49*a* and the device-side second engagement part 49*b* may not be necessarily arranged in point symmetry with respect to the center of the core convex part 5. Further, a direction in which the device-side first engagement part 49*a* is pressed by the cartridge-side first engagement part 124*a* and a direction in which the device-side second engagement part 49*b* is pressed by the cartridge-side second engagement part 124*b* are preferably opposite to each other.

Other Modified Examples

Besides the above embodiment, it is possible to employ various configurations without departing from the gist as a matter of course. For example, the above embodiment can be modified into the following modes.

Figure 23:
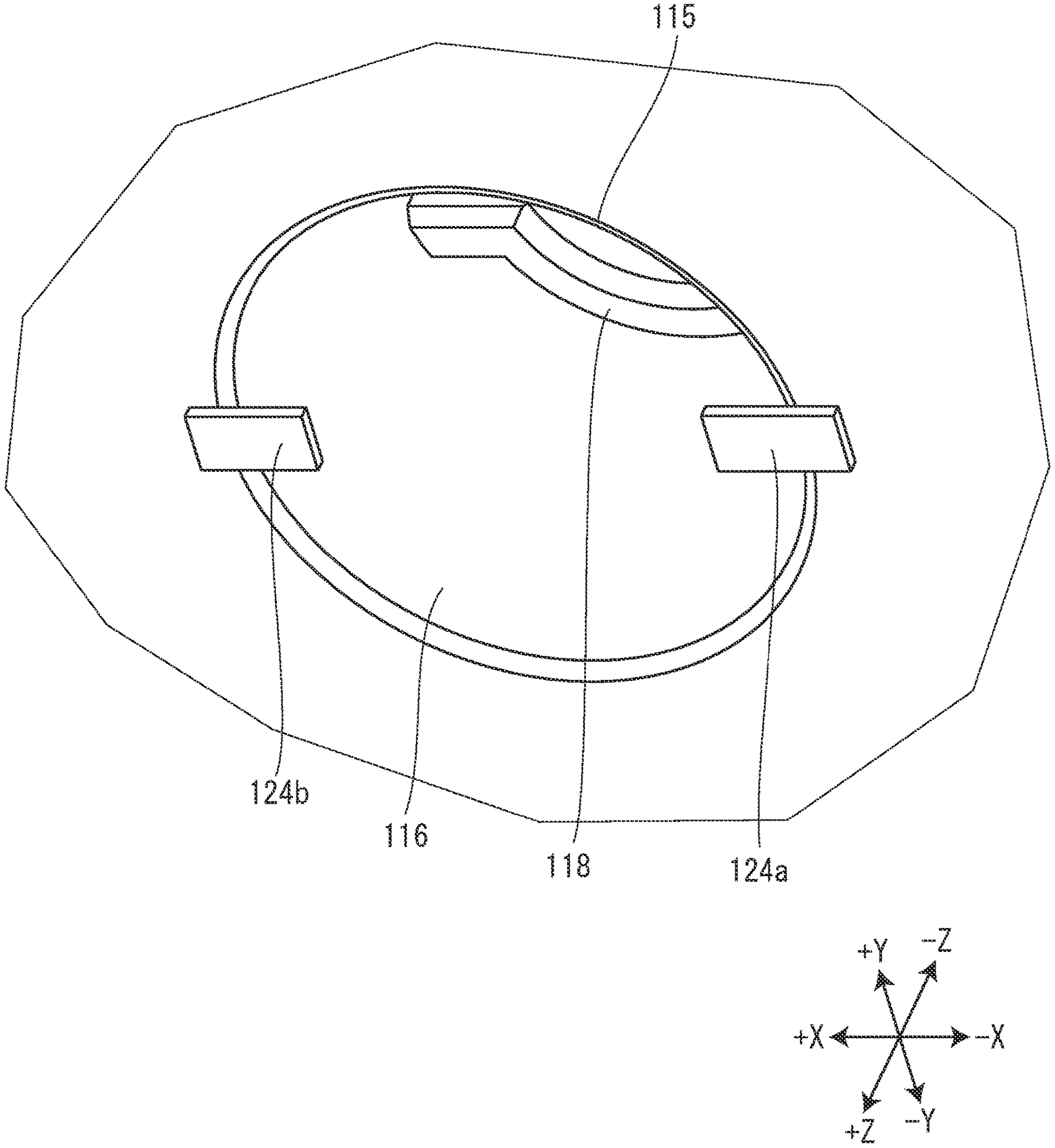
FIG. 23 is a partially-enlarged perspective view of the first tape cartridge showing the core concave part on which a cartridge-side engagement part according to a modified example is provided.

The cartridge-side engagement parts 124 may not be necessarily formed on the inner peripheral surface of the seat concave part 116 but may be provided at any spot of the tape cartridge 101 so long as the cartridge-side engagement parts 124 are capable of engaging the device-side engagement parts 49. For example, as shown in FIG. 23, the cartridge-side first engagement part 124*a* and the cartridge-side second engagement part 124*b* may be provided at the edge part of the core concave part 115 and partially overlap the core concave part 115 when seen from the back side in the installation direction. That is, the cartridge-side engagement parts 124 may be provided on the outside surface on the back side in the installation direction of the first cartridge case 106. Note that the cartridge-side first engagement part 124*a* and the cartridge-side second engagement part 124*b* shown in FIG. 23 have a substantially rectangular plate shape but the shape is not particularly limited. For example, the cartridge-side first engagement part 124*a* and the cartridge-side second engagement part 124*b* may have a long circular plate shape, a hemispherical shape, or the like. Further, the cartridge-side engagement parts 124 may protrude to the back side in the installation direction from the bottom surface of the seat concave part 116. On this occasion, the cartridge-side engagement parts 124 may or may not be integrally formed with the inner peripheral surface of the seat concave part 116.

When the tape cartridge 101 is installed, the first torque switching mechanism 31 may not necessarily change its state from the second state in which the torque to be transmitted to the first winding rotation element 16 is set at the relatively-small second torque to the first state in which the torque to be transmitted to the first winding rotation element 16 is set at the relatively-large first torque. Alternatively, the first torque switching mechanism 31 may change the state from the first state to the second state when the tape cartridge 101 is installed.

In this configuration, the cartridge-side engagement parts 124 are provided in the second tape cartridge 101*b* and are not provided in the first tape cartridge 101*a*, for example. Further, the first torque switching mechanism 31 includes a locking part that locks the movable gear 46 to be meshed with the first winding gear 41. When the second tape cartridge 101*b* is installed in the cartridge installation part 2, the cartridge-side engagement parts 124 engage the device-side engagement parts 49 so that the locking part is unlocked and the movable gear 46 is disengaged from the first winding gear 41. Further, when the second tape cartridge 101*b* is removed from the cartridge installation part 2, the movable gear 46 is locked to be meshed with the first winding gear 41 by the locking part. Thus, the first torque switching mechanism 31 changes its state from the first state to the second state when the second tape cartridge 101*b* is installed in the cartridge installation part 2. Further, the first torque switching mechanism 31 changes the state from the second state to the first state when the second tape cartridge 101*b* is removed from the cartridge installation part 2. On the other hand, the first torque switching mechanism 31 remains at the first state when the first tape cartridge 101*a* is installed in the cartridge installation part 2.

In the tape printing device 1, one of the first switching operation element 47*a* and the second switching operation element 47*b* may include a device-side third engagement part provided on the back side in the installation direction of the third seat opening part 38*c*, and the other thereof may include a device-side fourth engagement part provided on the back side in the installation direction of the fourth seat opening part 38*d*. That is, the tape printing device 1 may include, as the device-side engagement parts 49, the device-side third engagement part provided corresponding to the cartridge-side third engagement part 124*c* and the device-side fourth engagement part provided corresponding to the cartridge-side fourth engagement part 124*d*. In other words, the two facing device-side engagement parts 49 may not be provided on the +X side and the −X side of the tape printing device 1 as in the above embodiment but may be provided on the +Y side and the −Y side of the tape printing device 1.

In the configuration as well, the cartridge-side third engagement part 124*c* and the cartridge-side fourth engagement part 124*d* engage the device-side third engagement part and the device-side fourth engagement part, respectively, when the first tape cartridge 101*a* is installed in the cartridge installation part 2, whereby the first torque switching mechanism 31 changes its state from the second state to the first state. As described above, the first tape cartridge 101*a* includes the cartridge-side first engagement part 124*a*, the cartridge-side second engagement part 124*b*, the cartridge-side third engagement part 124*c*, and the cartridge-side fourth engagement part 124*d*. Therefore, the first tape cartridge 101*a* can comply with the tape printing device 1 including the device-side first engagement part 49*a* and the device-side second engagement part 49*b* and can comply with the tape printing device 1 including the device-side third engagement part and the device-side fourth engagement part. Accordingly, since the tape printing device 1 may include the device-side first engagement part 49*a* and the device-side second engagement part 49*b* as the device-side engagement parts 49 and may include the device-side third engagement part and the device-side fourth engagement part as the device-side engagement parts 49, the degree of freedom in the arrangement of the device-side engagement parts 49 can be increased.

Note that the first tape cartridge 101*a* may include only the cartridge-side first engagement part 124*a* and the cartridge-side second engagement part 124*b* among the four cartridge-side engagement parts 124 for the tape printing device 1 including the device-side first engagement part 49*a* and the device-side second engagement part 49*b*. Further, the first tape cartridge 101*a* may include only the cartridge-side third engagement part 124*c* and the cartridge-side fourth engagement part 124*d* among the four cartridge-side engagement parts 124 for the tape printing device 1 including the device-side third engagement part and the device-side fourth engagement part.

The number of the device-side engagement parts 49 is not limited to two but may be one or three or more. The number of the cartridge-side engagement parts 124 is not limited to four. For example, when the number of the device-side engagement parts 49 is two, the number of the cartridge-side engagement parts 124 may be two or more. In addition, the number of the cartridge-side engagement parts 124 may be one if one cartridge-side engagement part 124 engages the two device-side engagement parts 49.

The tape cartridge 101 may include an attachment installation part instead of the seat concave part 116 having the cartridge-side engagement parts 124, and an attachment provided with the seat concave part 116 having the cartridge-side engagement parts 124 may be detachably installed in the attachment installation part. According to the configuration, the attachment is installed in the attachment installation part of the tape cartridge 101 to function as an adjustment unit for engaging the device-side engagement part 49. At this time, a cartridge system including the tape cartridge 101 and the attachment installed in the attachment installation part of the tape cartridge 101 may be installed in the cartridge installation part 2. Alternatively, after the attachment is installed in the core convex part 5 of the tape printing device 1 in advance, the tape cartridge 101 may be installed in the cartridge installation part 2 as an embodiment. Further, the attachment may be provided with, for example, a flange part on the back side in the installation direction and have such a shape as to complement a part of the wall part of the first cartridge case 106.

In the cartridge installation part 2, the tape cartridge 101 and the ribbon cartridge 201 may not be necessarily alternatively installed but only the tape cartridge 101 may be installed. Further, the above embodiment and the modified examples may be combined together.

[Supplementary Note]

Hereinafter, a cartridge and a tape printing device will be supplementally noted.

A cartridge to be installed in a tape printing device including a cartridge installation part in which the cartridge including a winding core by which an ink ribbon is wound up is installed, a winding rotation element that engages the winding core when the cartridge is installed in the cartridge installation part, a core convex part that is provided in the cartridge installation part and protrudes to a front side in an installation direction of the cartridge, a device-side engagement part that is provided on a back side in the installation direction with respect to an opening part provided on the core convex part, and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, the cartridge including: a cartridge case that constitutes an outer shell of the cartridge and accommodates a printing tape, a tape core on which the printing tape is wound, the ink ribbon, and the winding core; a core concave part that is provided on the cartridge case and into which the core convex part is inserted from the back side in the installation direction when the cartridge is installed in the cartridge installation part; and a cartridge-side engagement part that engages the device-side engagement part when the core convex part is inserted into the core concave part to change the state of the torque switching mechanism from the second state to the first state or from the first state to the second state.

According to the configuration, the cartridge-side engagement part engages the device-side engagement part when the cartridge is installed in the cartridge installation part, whereby the torque switching mechanism changes the state thereof from the second state to the first state or from the first state to the second state. Thus, the torque to be transmitted to the winding rotation element is switched from the second torque to the first torque or from the first torque to the second torque. Accordingly, since the winding rotation element is not required to have a double-cylinder structure, the diameter of a winding core can be reduced and the cartridge can be miniaturized.

In this case, the tape printing device preferably includes a device-side first engagement part and a device-side second engagement part as the device-side engagement part, the cartridge preferably includes a cartridge-side first engagement part provided corresponding to the device-side first engagement part and a cartridge-side second engagement part provided corresponding to the device-side second engagement part as the cartridge-side engagement part, and the cartridge-side first engagement part and the cartridge-side second engagement part are preferably provided in point symmetry with respect to a center of the core concave part when seen from the installation direction.

According to the configuration, the cartridge and the torque switching mechanism do not engage with each other only at one spot but engage with each other at two spots, that is, the spot between the cartridge-side first engagement part and the device-side first engagement part and the spot between the cartridge-side second engagement part and the device-side second engagement part. In addition, the two engagement spots are arranged in point symmetry with respect to the center of the core concave part. Therefore, a load by the engagement acts on the cartridge in a balanced manner, the cartridge is prevented from being inclined with respect to the cartridge installation part, and the traveling of the printing tape and the ink ribbon can be improved.

In this case, the tape printing device of another type preferably includes a device-side third engagement part and a device-side fourth engagement part as the device-side engagement part, the cartridge preferably includes the cartridge-side first engagement part, the cartridge-side second engagement part, a cartridge-side third engagement part provided corresponding to the device-side third engagement part, and a cartridge-side fourth engagement part provided corresponding to the device-side fourth engagement part as the cartridge-side engagement part, and the cartridge-side third engagement part and the cartridge-side fourth engagement part are preferably provided in point symmetry with respect to the center of the core concave part when seen from the installation direction.

According to the configuration, the cartridge can also comply with the tape printing device including the device-side first engagement part and the device-side second engagement part and can also comply with the tape printing device including the device-side third engagement part and the device-side fourth engagement part. Accordingly, since the tape printing device may include the device-side first engagement part and the device-side second engagement part as the device-side engagement part and may include the device-side third engagement part and the device-side fourth engagement part as the device-side engagement part, the degree of freedom in the arrangement of the device-side engagement part can be increased.

In this case, the cartridge-side engagement part is preferably provided on an inner peripheral surface of the core concave part.

According to the configuration, the breakage of the cartridge-side engagement part can be prevented even when the cartridge drops.

In this case, the cartridge-side engagement part is preferably provided at an edge part of the core concave part and partially overlaps the core concave part when seen from the installation direction.

According to the configuration, the cartridge-side engagement part provided outside the core concave part can be caused to engage the device-side engagement part.

A tape printing device including: a cartridge installation part in which a first cartridge and a second cartridge each having a different width of an ink ribbon are to be alternatively installed, the first cartridge and the second cartridge including a printing tape, a tape core on which the printing tape is wound, the ink ribbon, a winding core by which the ink ribbon is wound up, a cartridge case in which the printing tape, the tape core, the ink ribbon, and the winding core are accommodated, and a core concave part that is provided on the cartridge case; a winding rotation element that engages the winding core when the cartridge is installed in the cartridge installation part; a stepped cylindrical core convex part that is provided in the cartridge installation part and inserted into the core concave part from a back side in an installation direction of the cartridge when the cartridge is installed in the cartridge installation part; a device-side engagement part that is provided on the back side in the installation direction with respect to an opening part provided on the core convex part; and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, wherein one of the first cartridge and the second cartridge has a cartridge-side engagement part that engages the device-side engagement part when the cartridge is installed in the cartridge installation part, and the torque switching mechanism changes the state thereof from the second state to the first state or from the first state to the second state by engagement between the cartridge-side engagement part and the device-side engagement part when the cartridge including the cartridge-side engagement part among the first cartridge and the second cartridge is installed in the cartridge installation part.

According to the configuration, the cartridge-side engagement part engages the device-side engagement part when the cartridge is installed in the cartridge installation part, whereby the torque switching mechanism changes the state thereof from the second state to the first state or from the first state to the second state. Thus, the torque to be transmitted to the winding rotation element is switched from the second torque to the first torque or from the first torque to the second torque. Accordingly, since the winding rotation element is not required to have a double-cylinder structure, the diameter of a winding core can be reduced and the cartridge can be miniaturized.

In this case, one of the first cartridge and the second cartridge preferably includes a cartridge-side first engagement part and a cartridge-side second engagement part as the cartridge-side engagement part, the tape printing device preferably includes a device-side first engagement part provided corresponding to the cartridge-side first engagement part and a device-side second engagement part provided corresponding to the cartridge-side second engagement part as the device-side engagement part, and the device-side first engagement part and the device-side second engagement part are preferably provided in point symmetry with respect to a center of the core convex part when seen from the installation direction in a state in which the cartridge is not installed.

According to the configuration, the cartridge and the torque switching mechanism do not engage with each other only at one spot but engage with each other at two spots, that is, the spot between the cartridge-side first engagement part and the device-side first engagement part and the spot between the cartridge-side second engagement part and the device-side second engagement part. In addition, the two engagement spots are arranged in point symmetry with respect to the center of the core convex part. Therefore, a load by the engagement acts on the cartridge in a balanced manner, the cartridge is prevented from being inclined with respect to the cartridge installation part, and the traveling of the printing tape and the ink ribbon can be improved.

In this case, the torque switching mechanism preferably has a first winding gear that is provided to be coaxial with the winding rotation element and rotates the winding rotation element, a second winding gear that is provided to be coaxial with the winding rotation element, receives rotation of a feeding motor in both the first state and the second state, and rotates the winding rotation element via the first winding gear, a first torque limiter that limits a torque to be transmitted from the first winding gear to the winding rotation element to the first torque, a second torque limiter that limits a torque to be transmitted from the second winding gear to the first winding gear to the second torque, and a movable gear that is configured to be capable of engaging and disengaging from the first winding gear, and the switching operation element preferably causes the movable gear to mesh with the first winding gear when the cartridge-side engagement part engages the device-side engagement part and preferably causes the movable gear to separate from the first winding gear when the cartridge-side engagement part disengages from the device-side engagement part.

According to the configuration, the cartridge-side engagement part engages the device-side engagement part and movable gear meshes with the first winding gear, whereby the torque switching mechanism changes the state thereof to a state in which the rotation of the feeding motor is input to the first winding gear via the movable gear, that is, the first state. On the other hand, the cartridge-side engagement part disengages from the device-side engagement part and the movable gear disengages from the first winding gear, whereby the torque switching mechanism changes the state thereof to a state in which the rotation of the feeding motor is input to the first winding gear via the second winding gear, that is, the second state.

In this case, the torque switching mechanism preferably has a gear support part that is configured to be rotatable so that the rotatably-supported movable gear contacts and separates from the first winding gear, the switching operation element preferably has a first switching operation element that is provided with the device-side first engagement part, allows the gear support part to rotate in a direction in which the movable gear comes close to the first winding gear when the device-side first engagement part engages the cartridge-side first engagement part, and prevents the gear support part from rotating in a direction in which the movable gear comes close to the first winding gear when the device-side first engagement part disengages from the cartridge-side first engagement part, and a second switching operation element that is provided with the device-side second engagement part and causes the gear support part to rotate in the direction in which the movable gear comes close to the first winding gear when the device-side second engagement part engages the cartridge-side second engagement part.

According to the configuration, the gear support part rotates in the direction in which the movable gear comes close to the first winding gear when the cartridge-side first engagement part and the cartridge-side second engagement part engage the device-side first engagement part and the device-side second engagement part, respectively, whereby the torque switching mechanism changes the state thereof to the first state. On the other hand, the gear support part rotates in a direction in which the movable gear separates from the first winding gear when the cartridge-side first engagement part and the cartridge-side second engagement part disengage from the device-side first engagement part and the device-side second engagement part, respectively, whereby the torque switching mechanism changes the state thereof to the second state.

In this case, the gear support part preferably has a first-operation-element-side support member that is rotatably provided and rotatably supports the movable gear, a second-operation-element-side support member that is rotatably provided and engages the second switching operation element, and an elastic member that elastically connects the first-operation-element-side support member and the second-operation-element-side support member to each other.

According to the configuration, even if the rotation amount of the second-operation-element-side support member fluctuates due to a dimensional fluctuation in the device-side second engagement part or the like, the fluctuation in the rotation amount can be absorbed by the elastic member. Thus, the movable gear can be caused to properly mesh with the first winding gear.

EXPLANATION OF REFERENCE SYMBOLS

1: tape printing device
2: cartridge installation part
5: core convex part
16: first winding rotation element
31: first torque switching mechanism
38: seat opening part
41: first winding gear
42: second winding gear
43: first slip spring
44: second slip spring
46: movable gear

47: switching operation element
47*a*: first switching operation element
47*b*: second switching operation element
48: gear support part
49: device-side engagement part
49*a*: device-side first engagement part
49*b*: device-side second engagement part
51: first-operation-element-side shaft insertion part
52: first-operation-element-side engagement part
63: first-operation-element-side support member
64: second-operation-element-side support member
65: support part spring
101: tape cartridge
102: tape core
105: first winding core
106: first cartridge case
107: first printing tape
109: first ink ribbon
115: core concave part
124: cartridge-side engagement part
124*a*: cartridge-side first engagement part
124*b*: cartridge-side second engagement part
124*c*: cartridge-side third engagement part
124*d*: cartridge-side fourth engagement part

The invention claimed is:

1. A cartridge to be installed in a tape printing device including a cartridge installation part in which the cartridge including a winding core by which an ink ribbon is wound up is installed, a winding rotation element that engages the winding core when the cartridge is installed in the cartridge installation part, a core convex part that is provided in the cartridge installation part and protrudes to a front side in an installation direction of the cartridge, a device-side engagement part that is provided on a back side in the installation direction with respect to an opening part provided on the core convex part, and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, the cartridge comprising:

a cartridge case that constitutes an outer shell of the cartridge and accommodates a printing tape, a tape core on which the printing tape is wound, the ink ribbon, and the winding core;

a core concave part that is provided on the cartridge case and into which the core convex part is inserted from the back side in the installation direction when the cartridge is installed in the cartridge installation part; and a cartridge-side engagement part that engages the device-side engagement part when the core convex part is inserted into the core concave part to change the state of the torque switching mechanism from the second state to the first state or from the first state to the second state, the cartridge-side engagement part entering the core convex part via the opening part when the core convex part is inserted into the core concave part.

2. The cartridge according to claim 1, wherein the tape printing device includes a device-side first engagement part and a device-side second engagement part as the device-side engagement part, the cartridge includes a cartridge-side first engagement part provided corresponding to the device-side first engagement part and a cartridge-side second engagement part provided corresponding to the device-side second engagement part as the cartridge-side engagement part, and the cartridge-side first engagement part and the cartridge-side second engagement part are provided in point symmetry with respect to a center of the core concave part when seen from the installation direction.

3. The cartridge according to claim 2, wherein a tape printing device of another type includes a device-side third engagement part and a device-side fourth engagement part as the device-side engagement part, the cartridge includes the cartridge-side first engagement part, the cartridge-side second engagement part, a cartridge-side third engagement part provided corresponding to the device-side third engagement part, and a cartridge-side fourth engagement part provided corresponding to the device-side fourth engagement part as the cartridge-side engagement part, and the cartridge-side third engagement part and the cartridge-side fourth engagement part are provided in point symmetry with respect to the center of the core concave part when seen from the installation direction.

4. The cartridge according to claim 1, wherein the cartridge-side engagement part is provided on an inner peripheral surface of the core concave part.

5. The cartridge according to claim 1, wherein the cartridge-side engagement part is provided at an edge part of the core concave part and partially overlaps the core concave part when seen from the installation direction.

6. A tape printing device comprising:

a cartridge installation part in which a first cartridge and a second cartridge each having a different width of an ink ribbon are to be alternatively installed, the first cartridge and the second cartridge including a printing tape, a tape core on which the printing tape is wound, the ink ribbon, a winding core by which the ink ribbon is wound up, a cartridge case in which the printing tape, the tape core, the ink ribbon, and the winding core are accommodated, and a core concave part that is provided on the cartridge case;

a winding rotation element that engages the winding core when the cartridge is installed in the cartridge installation part;

a stepped cylindrical core convex part that is provided in the cartridge installation part and inserted into the core concave part from a back side in an installation direction of the cartridge when the cartridge is installed in the cartridge installation part;

a device-side engagement part that is provided on the back side in the installation direction with respect to an opening part provided on the core convex part; and a torque switching mechanism that has a switching operation element provided with the device-side engagement part and changes a state thereof between a first state in which a torque to be transmitted to the winding rotation element is set at a first torque and a second state in which the torque is set at a second torque smaller than the first torque, wherein one of the first cartridge and the second cartridge has a cartridge-side engagement part that engages the device-side engagement part when the cartridge is installed in the cartridge installation part, and the torque switching mechanism changes the state thereof from the second state to the first state or from the first state to the second state by engagement between the cartridge-side engagement part and the device-side engagement part when the cartridge including the cartridge-side engagement part among the first cartridge and the second cartridge is installed in the cartridge installation part.

7. The tape printing device according to claim 6, wherein one of the first cartridge and the second cartridge includes a cartridge-side first engagement part and a cartridge-side second engagement part as the cartridge-side engagement part, the tape printing device includes a device-side first engagement part provided corresponding to the cartridge-side first engagement part and a device-side second engagement part provided corresponding to the cartridge-side second engagement part as the device-side engagement part, and the device-side first engagement part and the device-side second engagement part are provided in point symmetry with respect to a center of the core convex part when seen from the installation direction in a state in which the cartridge is not installed.

8. The tape printing device according to claim 7, wherein the torque switching mechanism has a first winding gear that is provided to be coaxial with the winding rotation element and rotates the winding rotation element, a second winding gear that is provided to be coaxial with the winding rotation element, receives rotation of a feeding motor in both the first state and the second state, and rotates the winding rotation element via the first winding gear, a first torque limiter that limits a torque to be transmitted from the first winding gear to the winding rotation element to the first torque, a second torque limiter that limits a torque to be transmitted from the second winding gear to the first winding gear to the second torque, and a movable gear that is configured to be capable of engaging and disengaging from the first winding gear, and the switching operation element causes the movable gear to mesh with the first winding gear when the cartridge-side engagement part engages the device-side engagement part and causes the movable gear to separate from the first winding gear when the cartridge-side engagement part disengages from the device-side engagement part.

9. The tape printing device according to claim 8, wherein the torque switching mechanism has a gear support part that is configured to be rotatable so that the rotatably-supported movable gear contacts and separates from the first winding gear, the switching operation element has a first switching operation element that is provided with the device-side first engagement part, allows the gear support part to rotate in a direction in which the movable gear comes to the first winding gear when the device-side first engagement part engages the cartridge-side first engagement part, and prevents the gear support part from rotating in the direction in which the movable gear comes to the first winding gear when the device-side first engagement part disengages from the cartridge-side first engagement part, and a second switching operation element that is provided with the device-side second engagement part and causes the gear support part to rotate in the direction in which the movable gear comes to the first winding gear when the device-side second engagement part engages the cartridge-side second engagement part.

10. The tape printing device according to claim 9, wherein the gear support part has a first-operation-element-side support member that is rotatably provided and rotatably supports the movable gear, a second-operation-element-side support member that is rotatably provided and engages the second switching operation element, and an elastic member that elastically connects the first-operation-element-side support member and the second-operation-element-side support member to each other.

* * * * *